United States Patent
Okada

(10) Patent No.: US 10,769,235 B2
(45) Date of Patent: Sep. 8, 2020

(54) INFORMATION PROCESSING APPARATUS, INFORMATION PROCESSING SYSTEM, AND INFORMATION PROCESSING METHOD

(71) Applicant: CANON KABUSHIKI KAISHA, Tokyo (JP)

(72) Inventor: Shuichi Okada, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 185 days.

(21) Appl. No.: 15/916,665

(22) Filed: Mar. 9, 2018

(65) Prior Publication Data
US 2018/0268074 A1    Sep. 20, 2018

(30) Foreign Application Priority Data

Mar. 14, 2017 (JP) ............................... 2017-049060
Nov. 30, 2017 (JP) ............................... 2017-230865

(51) Int. Cl.
| | |
|---|---|
| G06F 16/958 | (2019.01) |
| H04L 29/08 | (2006.01) |
| G06F 21/62 | (2013.01) |
| H04L 29/06 | (2006.01) |
| G06F 21/31 | (2013.01) |
| G06F 21/55 | (2013.01) |
| G06F 40/274 | (2020.01) |
| G06F 40/126 | (2020.01) |

(52) U.S. Cl.
CPC ............ *G06F 16/986* (2019.01); *G06F 21/31* (2013.01); *G06F 21/554* (2013.01); *G06F 21/6263* (2013.01); *G06F 40/274* (2020.01); *H04L 63/08* (2013.01); *H04L 67/02* (2013.01); *G06F 40/126* (2020.01)

(58) Field of Classification Search
CPC .... G06F 16/986; G06F 21/554; G06F 17/276; G06F 21/31; G06F 21/6263; G06F 17/2217; G06F 40/274; G06F 40/126; H04L 63/08; H04L 67/02
See application file for complete search history.

(56) References Cited

U.S. PATENT DOCUMENTS

| | | | |
|---|---|---|---|
| 8,140,855 B2* | 3/2012 | Zhu | G06F 21/34 713/184 |
| 9,497,190 B2* | 11/2016 | Osawa | H04L 63/083 |
| 2010/0122319 A1* | 5/2010 | Nakashima | H04L 63/08 726/2 |

(Continued)

FOREIGN PATENT DOCUMENTS

JP    2015125620 A    7/2015

*Primary Examiner* — Matthew Smithers
(74) *Attorney, Agent, or Firm* — Rossi, Kimms & McDowell LLP

(57) ABSTRACT

It is determined whether the URL of a screen displayed by a web browser matches the URL included in a response to an obtainment request. If the URL of the screen displayed by the web browser is determined to match the URL included in the response to the obtainment request, a user currently using an information processing apparatus is a user permitted to use an autocomplete function, and the screen displayed in the web browser can be trusted, a script is loaded in the web browser and executed. The web browser carries out the autocomplete through this script.

19 Claims, 24 Drawing Sheets

(56) References Cited

U.S. PATENT DOCUMENTS

| | | | |
|---|---|---|---|
| 2012/0069386 A1* | 3/2012 | St. Laurent | G06F 3/1204 358/1.15 |
| 2012/0224214 A1* | 9/2012 | Ito | H04N 1/00464 358/1.14 |
| 2014/0136543 A1* | 5/2014 | Frieden | G06F 16/90324 707/741 |
| 2014/0379917 A1* | 12/2014 | Kano | H04N 1/00127 709/225 |
| 2015/0002888 A1* | 1/2015 | Tsujimoto | G03G 15/502 358/1.14 |
| 2015/0007279 A1* | 1/2015 | Hattori | H04L 63/08 726/5 |
| 2015/0163214 A1* | 6/2015 | Sakai | G06F 16/00 726/6 |
| 2015/0188914 A1* | 7/2015 | Osawa | H04L 63/083 726/5 |

\* cited by examiner

```
javascript:(
function(url){
var s=document.createElement("script");
s.src="https://formdataserver.xxx.yyy/js/loader.js?url"+url;
document.body.appendChild(s);
}
)();
```
~501

FIG. 7

| URL (701) | USERNAME (702) | ELEMENT NAME (703) | VALUE (704) |
|---|---|---|---|
| http://authappserver.xxx.yyy/service1/login.html | user1 | username | xxx |
| http://authappserver.xxx.yyy/service1/login.html | user1 | password | yyy |
| http://www.serverB.xxx.yyy/service2/logonid.html | user2 | email | zzz@zzz.com |
| http://www.serverB.xxx.yyy/service2/logonpassword.html | user2 | password | zzzzzzz |
| ... | | | |

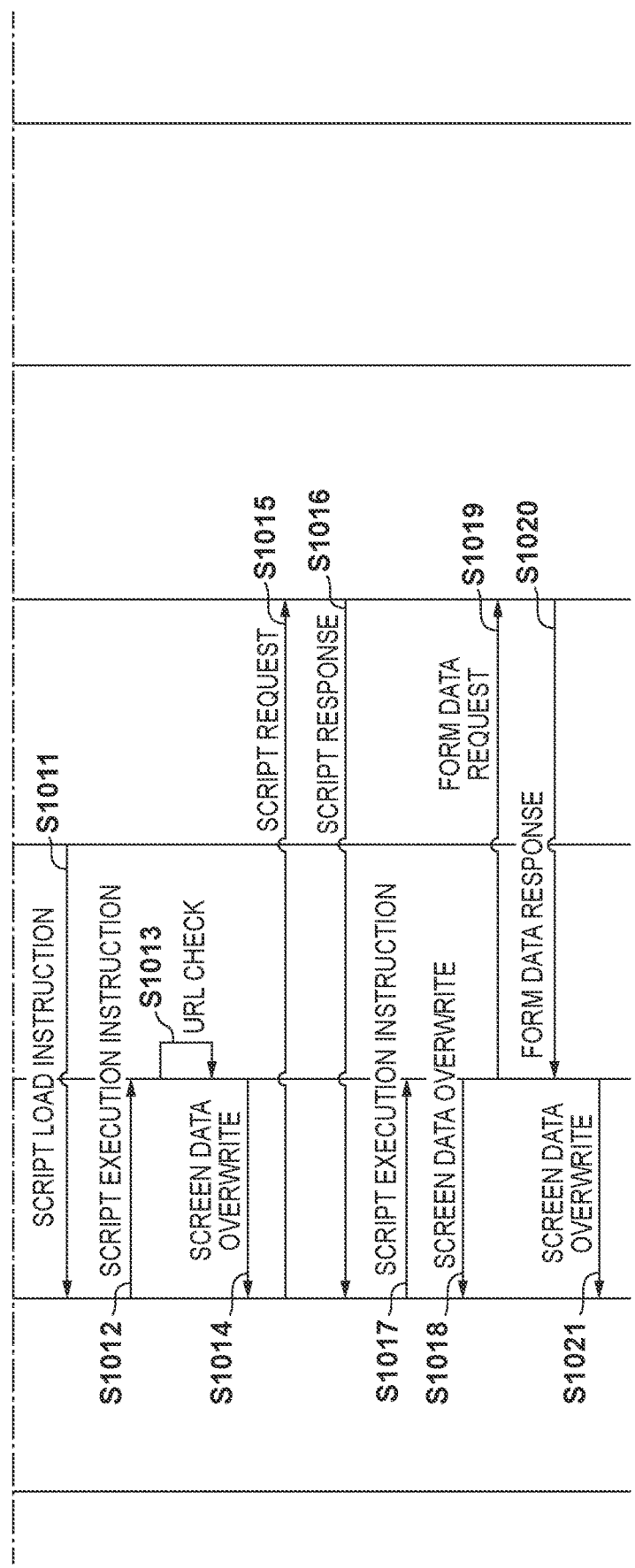

FIG. 12A

```
<!DOCTYPE html>
<html>
<head>
  <meta content="text/html;charset=UTF-8"http-equiv="Content-Type"></meta>

<script type="text/javascript"src="AutoCompNext.js"></script>   ⌒1201

<script type="text/javascript">
    function funcLoad(){                                           ⌒1202
      MW.autoCompNext.notify("http://authappserver.xxx.yyy/service1/loginid.html",
      http://authappserver.xxx.yyy/service1/loginpw.html,password);
    };
  </script>

<meta http-equiv="Refresh"                                       ⌒1203
    content="5;URL=http://authappserver.xxx.yyy/service1/loginid.html">
</head>
<body>
  .
  .
  .
</body>
</html>
```

FIG. 12B

```
<!DOCTYPE html>
<html>
<head>
  <meta content="text/html;charset=UTF-8"http-equiv="Content-Type"></meta>
                                                                    1204
  <script type="text/javascript"src="AutoCompNext.js"></script>

<script type="text/javascript">
    function funcLoad(){                                            1205
      MW.autoCompNext.notify("http://authappserver.xxx.yyy/service1/loginid.html");
    };
  </script>

<meta http-equiv="Refresh"                                        1206
    content="5;URL=http://authappserver.xxx.yyy/service1/loginid.html">
</head>
<body>
  .
  .
</body>
</html>
```

FIG. 13

```
<!DOCTYPE html PUBLIC"-//W3C//DTD XHTML 1.0 Transitional//EN"
"http://www.w3.org/TR/xhtml1/DTD/xhtml1-transitional.dtd">
<html xmlns="http://www.w3.org/1999/xhtml">
<head>
  <title>Service1 LOGIN</title>
</head>
<body>
  <form method="post"action="login.html">
    <p>ENTER YOUR USERNAME AND PASSWORD</p>
    <div class="c1">
      <p>USERNAME<input name="username"type="text"/></p>     ～1301
      <p>PASSWORD<input name="password"type="password"/></p> ～1302
    </div>
    <input type="submit"value="LOGIN"/> ～1303
  </form>
</body>
</html>
```

FIG. 15

```
javascript:(
function(){
var s=document.createElement("script");
s.src="https://formdataserver.xxx.yyy/js/main.js"+"?
url=http%3A%2F%2Fauthappserver.xxx.yyy%2F
service1%2Flogin.html&deviceuser=user1";  ~1501
document.body.appendChild(s);
}
)();
```

FIG. 16

```
function load(){  ~1601
  var xhr=new XMLHttpRequest;
  xhr.onload=function(){
    //SET LOADED VALUE IN element.   }~1602
    ...
  };
  xhr.open('POST',
'https://formdataserver.xxx.yyy/loadService/');
    ...                                          }~1603
  xhr.send('id=0123456789');
};

function save(){  ~1604
  var reqdata='';
  for(...){
    //SET name AND value OF element IN reqdata  }~1605
    ...
  }
  var xhr=new XMLHttpRequest;
  xhr.open('post',
'https://formdataserver.xxx.yyy/saveService/');   }~1606
  xhr.send('id=0123456789,'+reqdata);
}

(function(){  ~1607
  //ADD LOAD BUTTON
  var loadButton=document.createElement("input");
  loadButton.type="button";
  loadButton.onclick=function(){load()};          }~1608
  ...
  document.body.appendChild(loadButton);

//ADD SAVE BUTTON
  var saveButton=document.createElement("input");
  saveButton.type="button";
  saveButton.onclick=function(){save()};          }~1609
  ...
  document.body.appendChild(saveButton);

//EXECUTE LOAD
  load();  ~1610
})();
```

FIG. 19A

| BUTTON ID (1900) | BUTTON NAME (1901) | SOFTWARE MODULE (1902, 1903) |
|---|---|---|
| Copy | Copy | Copy |
| Fax | Fax | Fax |
| WebBrowser | WebBrowser | WebBrowser |
| WebBrowser01 | Service1 | WebBrowser |
| WebBrowser02 | Service2 | WebBrowser |
| ... | | |

FIG. 19B

| BUTTON ID (1904, 1905) | ADMINISTRATOR-REGISTERED BUTTON (1906) |
|---|---|
| WebBrowser | No |
| WebBrowser01 | Yes |
| WebBrowser02 | Yes |
| ... | |

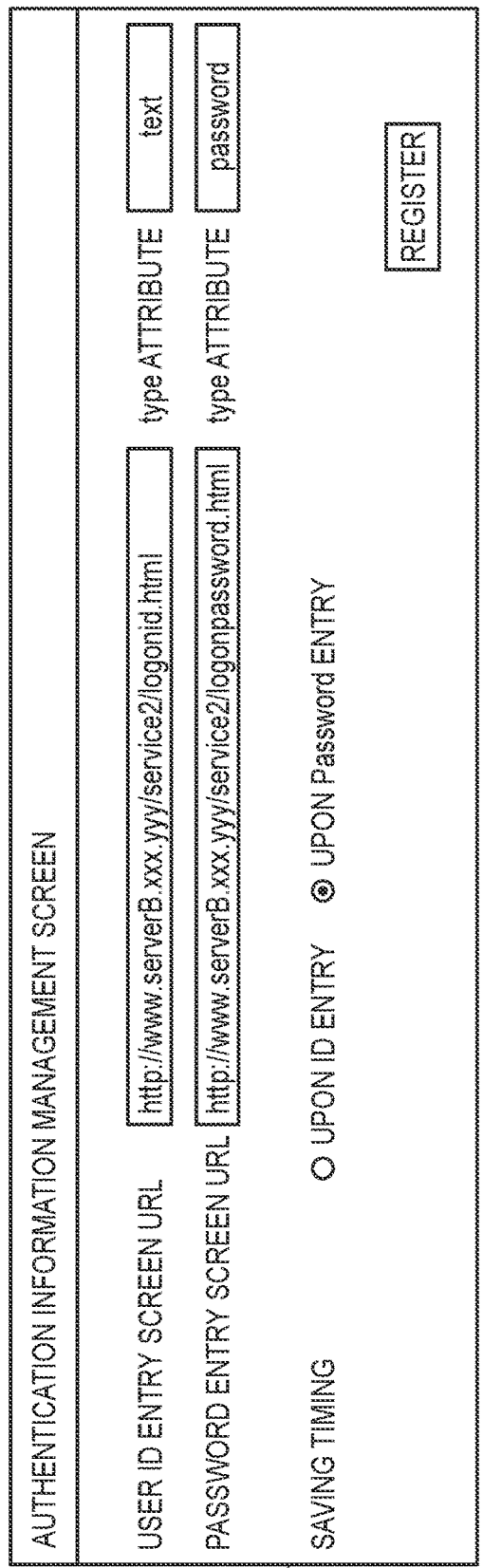

INFORMATION PROCESSING APPARATUS, INFORMATION PROCESSING SYSTEM, AND INFORMATION PROCESSING METHOD

BACKGROUND OF THE INVENTION

Field of the Invention

The present invention relates to an information processing apparatus including a web browser or the like that, for example, receives screen data from a web server and displays a screen on the basis of that screen data, and to an information processing method and a non-transitory computer-readable medium.

Description of the Related Art

Information processing apparatuses such as personal computers (PCs) are known to include web browsers and display screens on the basis of screen data (HyperText Markup Language (HTML) data, for example) provided by a web server on a network. The screens displayed in the web browser of the information processing apparatus include an operation screen for operating a web application executed by the web server.

Some existing web applications have functions for authenticating the user of the web application. When using such a web application, the web application first provides, to the web browser, HTML data containing a form for entering user information. The web browser then displays a screen based on the received HTML data. Once the user enters user information, such as a username and a password, through the displayed screen, the web browser sends the content of the form (that is, the user information that has been entered) to the web application, and user authentication is then carried out on the web application side.

In a situation where user information is entered in the screen displayed in the web browser for user authentication by the web application, the user must enter the user information each time he or she uses the web application. In response to this situation, a technique called "autocomplete", which stores user information in the web browser on a user-by-user basis once the user information has been entered by a user and then automatically enters the stored user information in the screen when the screen is displayed in the web browser, is known.

According to Japanese Patent Laid-Open No. 2015-125620, a first script is included in information of a screen for entering user information, and the first script is executed in the web browser. When screen information communicated by the first script is completely loaded, a second script for automatically entering user information, which has been entered by a user before, in the screen is executed. This reduces the burden on the user for entering information in the screen displayed in the web browser, and also makes it possible for the web application to designate pages for which the burden on the user for entering information is to be reduced.

However, according to Japanese Patent Laid-Open No. 2015-125620, the screen information of the application subject to autocomplete must include the scripts beforehand. As such, there is a problem in that the scripts cannot be included in the screen information in cases where the user information is entered in a screen located at a different domain from the web application and that is shared with another application, and thus autocomplete cannot be used.

Furthermore, it is possible to save the user information even if the screen of the application subject to autocomplete cannot be trusted, and there is thus a risk of usernames, passwords, and so on being leaked.

SUMMARY OF THE INVENTION

The present invention provides a system for enabling a web application to designate a page, at a different domain from the web application, for which the burden on a user for entering information into a screen displayed in a web browser is to be reduced. The present invention also provides a system for using autocomplete only on screens that a user can trust.

According to an aspect of the present invention, there is provided an information processing apparatus, including a web browser, that can connect to a web server, the apparatus comprising: at least one processor and at least one memory coupled to each other and cooperating to act as: an obtainment unit that obtains location information indicating a location of user interface information expressing a user interface for entering first user information for authentication requested by the web server; and a setting unit that, if supplementary information entered previously through the user interface based on the user interface information and associated with second user information that is user information of a user logged into the information processing apparatus is saved, sets the supplementary information as a value of the first user information entered through the user interface in the case where the web browser has received the user interface information on the basis of the location information.

According to another aspect of the present invention, there is provided an information processing system comprising, in a connected state: a web server; an authentication web server; a form data management server; and an information processing apparatus, including a web browser, that can connect to a web server, the apparatus comprising: an obtainment unit that obtains location information indicating a location of user interface information expressing a user interface for entering first user information for authentication requested by the web server; and a setting unit that, if supplementary information entered previously through the user interface based on the user interface information and associated with second user information that is user information of a user logged into the information processing apparatus is saved, sets the supplementary information as a value of the first user information entered through the user interface in the case where the web browser has received the user interface information on the basis of the location information.

According to the present invention, a web application can designate a page, at a different domain from the web application, for which the burden on a user for entering information into a screen displayed in a web browser is to be reduced. Additionally, the burden of entering a username and the password can be reduced even different screens are used for entering the username and password. Furthermore, autocomplete is used only on screens that can be trusted, and thus situations in which user information, such as usernames and passwords, is leaked can be suppressed.

Further features of the present invention will become apparent from the following description of exemplary embodiments with reference to the attached drawings.

BRIEF DESCRIPTION OF THE DRAWINGS

FIG. 7 is a diagram illustrating a form data management table.

FIGS. 10A and 10B are sequence charts illustrating operations carried out by the information processing system as a whole.

FIG. 12A is a diagram illustrating an example of HTML data returned by a web application 810 (in a case where different screens are used for entering a username and password).

FIG. 12B is a diagram illustrating an example of HTML data returned by the web application 810 (in a case where the same screen is used for entering a username and password).

FIG. 13 is a diagram illustrating an example of HTML data returned by an authentication web application 814.

FIG. 15 is a diagram illustrating an example of a script through which the web browser monitoring unit 408 instructs the web browser 405 to load data.

FIG. 16 is a diagram illustrating an example of a script returned by a script returning unit 614.

FIGS. 19A and 19B are a diagram illustrating a menu screen button ID management table held by the menu management unit 402 and a diagram illustrating a button ID management table held by a button ID storage unit 409.

FIGS. 20A and 20B are diagrams illustrating screens in the web browser monitoring unit 408.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Information Processing System

Figure 1:
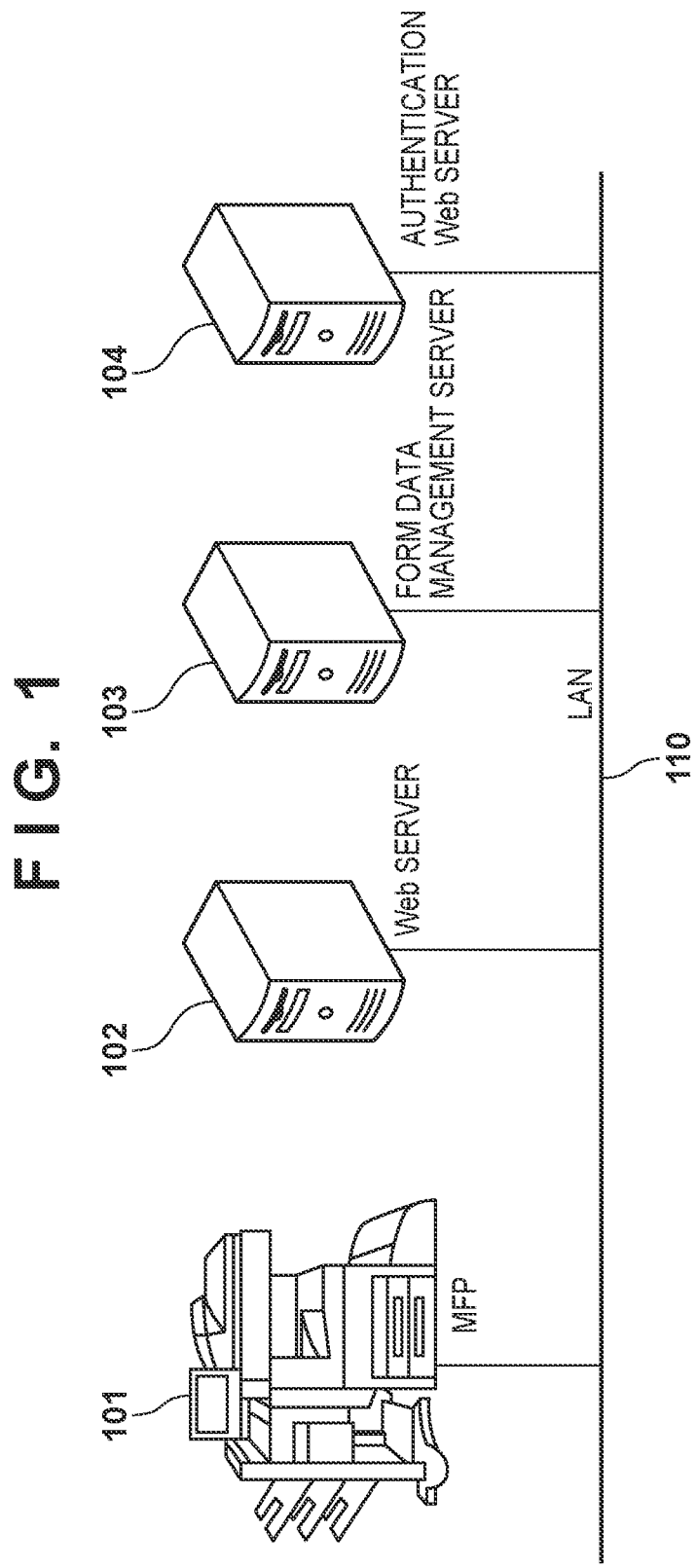
FIG. 1 is a diagram illustrating an information processing system as a whole.

First, an example of the configuration of an information processing system according to the present embodiment will be described with reference to FIG. 1. An information processing system 100 includes a multifunction peripheral (MFP) 101, which is an example of an information processing apparatus, a web server 102, an authentication web server 104, and a form data management server 103, which is an example of an external apparatus. The MFP 101, the web server 102, the authentication web server 104, and the form data management server 103 included in the information processing system 100 are communicatively connected to each other over a local area network (LAN) 110. Note that apparatuses aside from those described above may be connected to the LAN 110 (a network) and constitute a part of the information processing system 100. Additionally, the functions of the form data management server may be incorporated into the MFP 101. The web server 102 and the authentication web server 104 have different domains.

Configuration of Information Processing Apparatus

Figure 2:
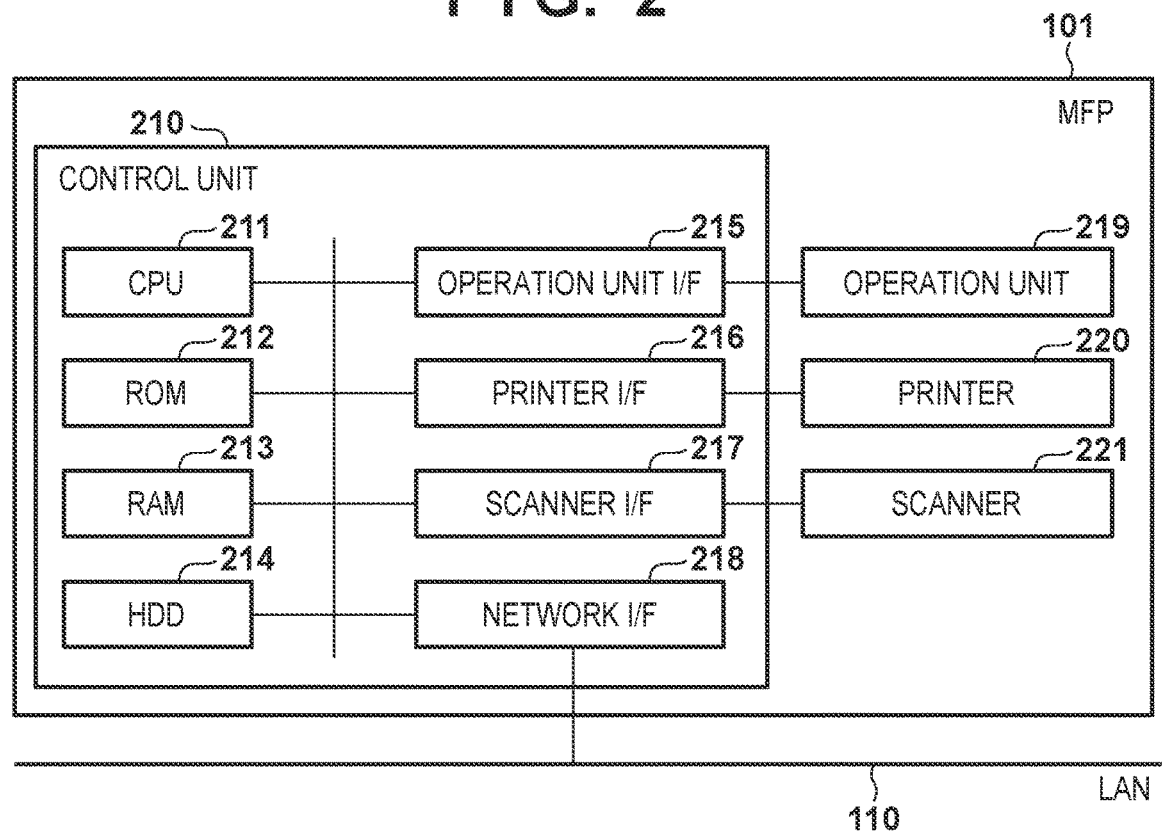
FIG. 2 is a block diagram illustrating the configuration of an MFP 101.

An example of the configuration of the MFP 101, which is an information processing apparatus, will be described next with reference to FIG. 2. The MFP 101 includes a control unit 210, an operation unit 219, a printer 220, and a scanner 221. The control unit 210 includes a CPU 211, ROM 212, RAM 213, an HDD 214, an operation unit I/F 215, a printer I/F 216, a scanner I/F 217, and a network I/F 218.

The CPU 211 controls the operations of the MFP 101 as a whole. The CPU 211 reads out control programs stored in the ROM 212 and executes various types of control processes, such as reading control, transmission control, and so on. As a result, the MFP 101 can provide various types of services, such as copying, scanning (sending), and printing. The RAM 213 is used as the main memory of the CPU 211, a temporary storage region such as a work area, or the like. The HDD 214 stores image data, various types of programs, and the like.

The operation unit I/F 215 connects the operation unit 219 to the control unit 210. The operation unit 219 includes a liquid crystal display unit having a touch panel function, a keyboard, or the like. The printer I/F 216 connects the printer 220 to the control unit 210. Image data that is to be printed by the printer 220 is transferred from the control unit 210 via the printer I/F 216, and is printed onto a recording medium by the printer 220. The scanner I/F 217 connects the scanner 221 to the control unit 210. The scanner 221 reads an image on a document and generates image data therefrom, and inputs the generated image data into the control unit 210 via the scanner I/F 217. The network I/F 218 connects the control unit 210 (the MFP 101) to the LAN 110. The network I/F 218 controls communication with apparatuses on the LAN 110 (e.g. the web server 102 and the form data management server 103).

Web Server

Figure 3:
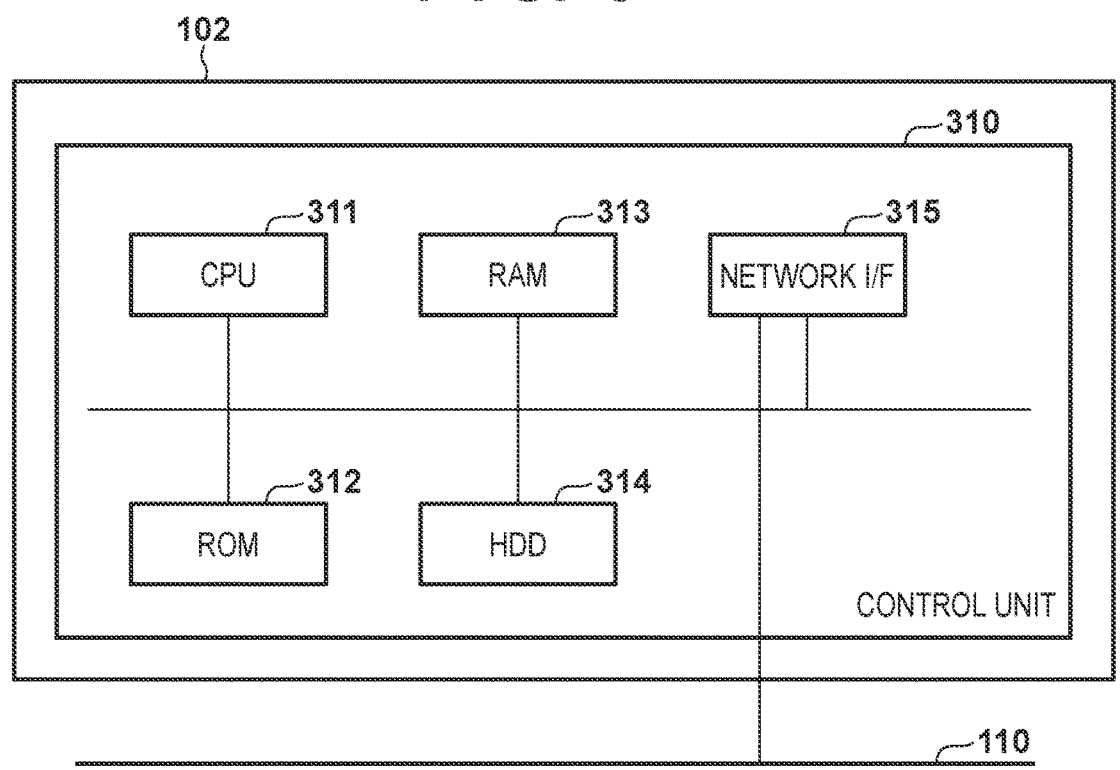
FIG. 3 is a block diagram illustrating the configuration of a web server 102.

An example of the configuration of the web server 102 will be described next with reference to FIG. 3. Note that the authentication web server 104 and the form data management server 103 also have configurations similar to that of the web server 102. A control unit 310 includes a CPU 311, ROM 312, RAM 313, an HDD 314, and a network I/F 315. The control unit 310 controls the operations of the web server 102 as a whole. The CPU 311 reads out control programs stored in the ROM 312 and executes various types of control processes. The RAM 313 is used as the main memory of the CPU 311, a temporary storage region such as a work area, or the like. The HDD 314 stores image data, various types of programs, and the like. The network I/F 315 connects the control unit 310 (the web server 102) to the LAN 110. The network I/F 315 exchanges various types of information with other apparatuses located on the LAN 110.

Software Configuration of Information Processing Apparatus

Figure 4:
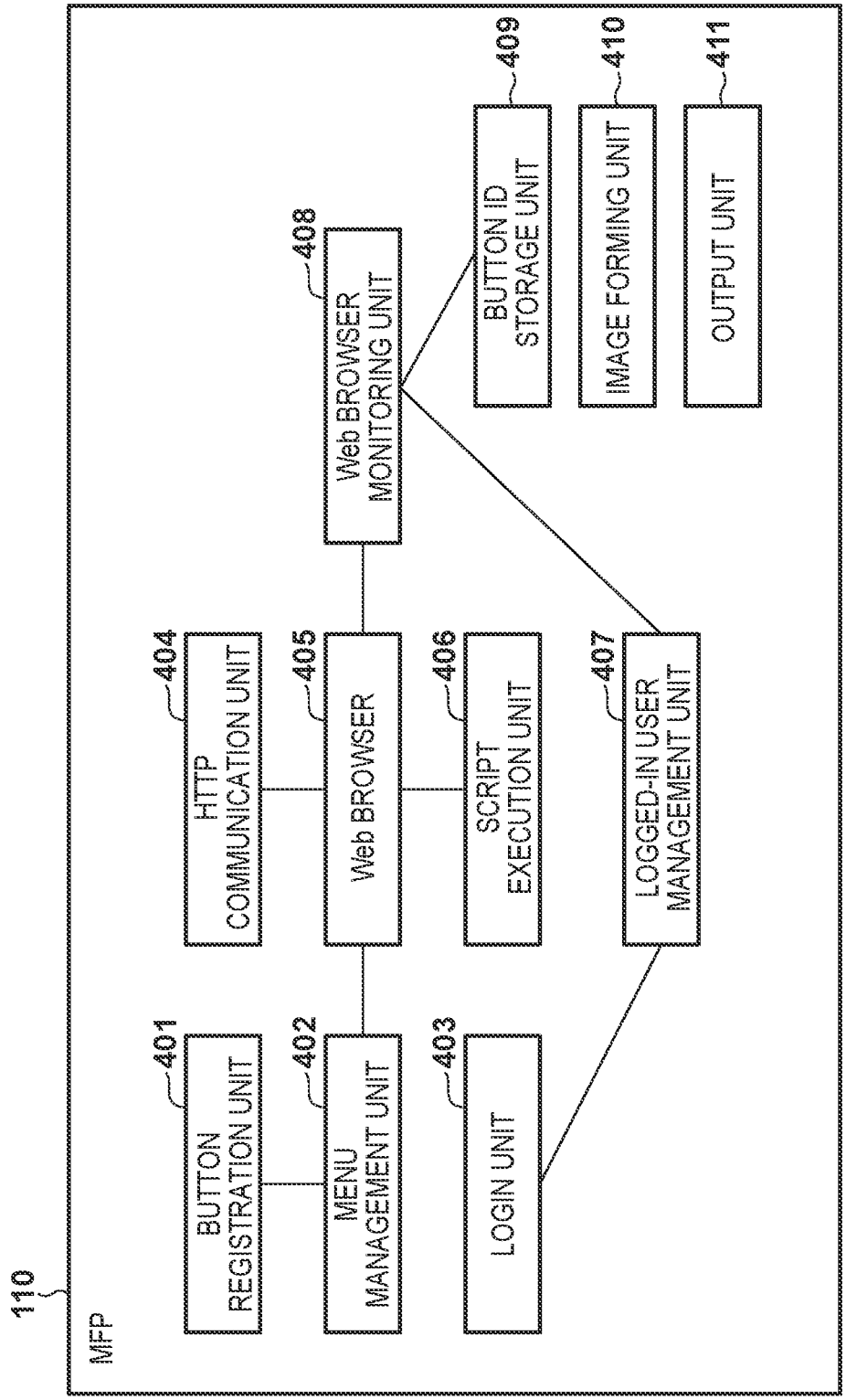
FIG. 4 is a diagram illustrating the software configuration of the MFP 101.

The software configuration of the MFP 101 will be described next with reference to FIG. 4. The functional units illustrated in FIG. 4 are implemented by the CPU 211 of the MFP 101 executing programs stored in the HDD 214 of the MFP 101. Note that the MFP 101 includes various types of functional units in addition to the functional units illustrated here. Additionally, the present embodiment is not limited to this configuration, and the software configuration described hereinafter may be implemented as a hardware configuration or as a combined hardware-software configuration.

Figure 18A:
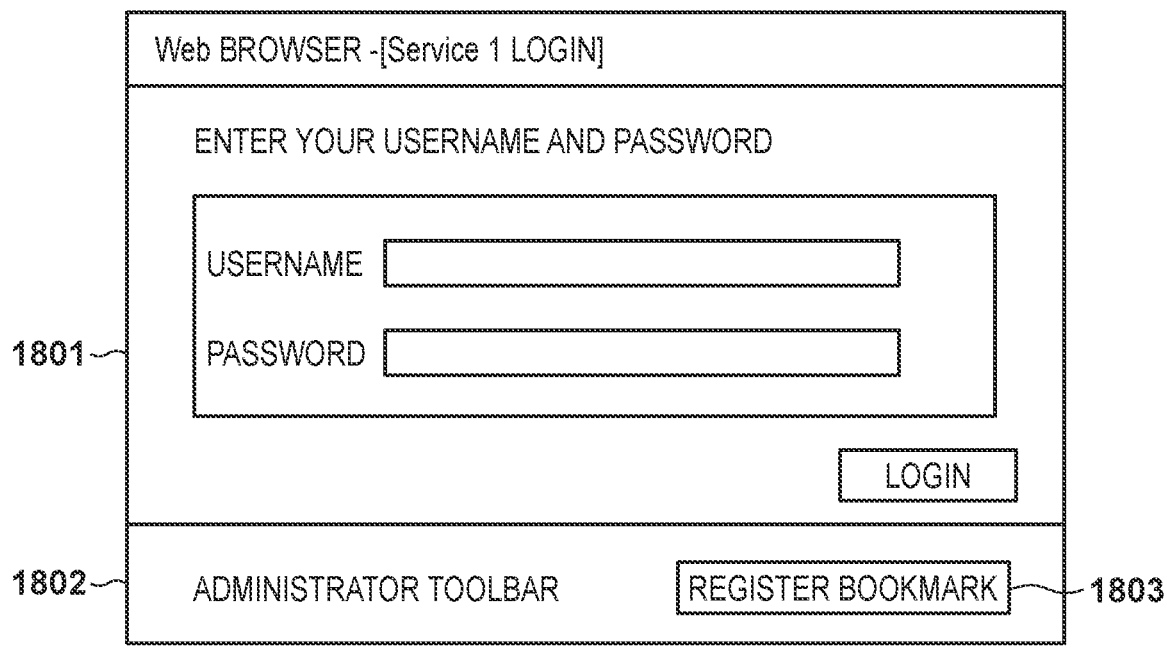
FIGS. 18A and 18B are diagrams illustrating operations carried out when an administrator of the MFP 101 registers a GUI button in a menu management unit 402.
Figure 18B:
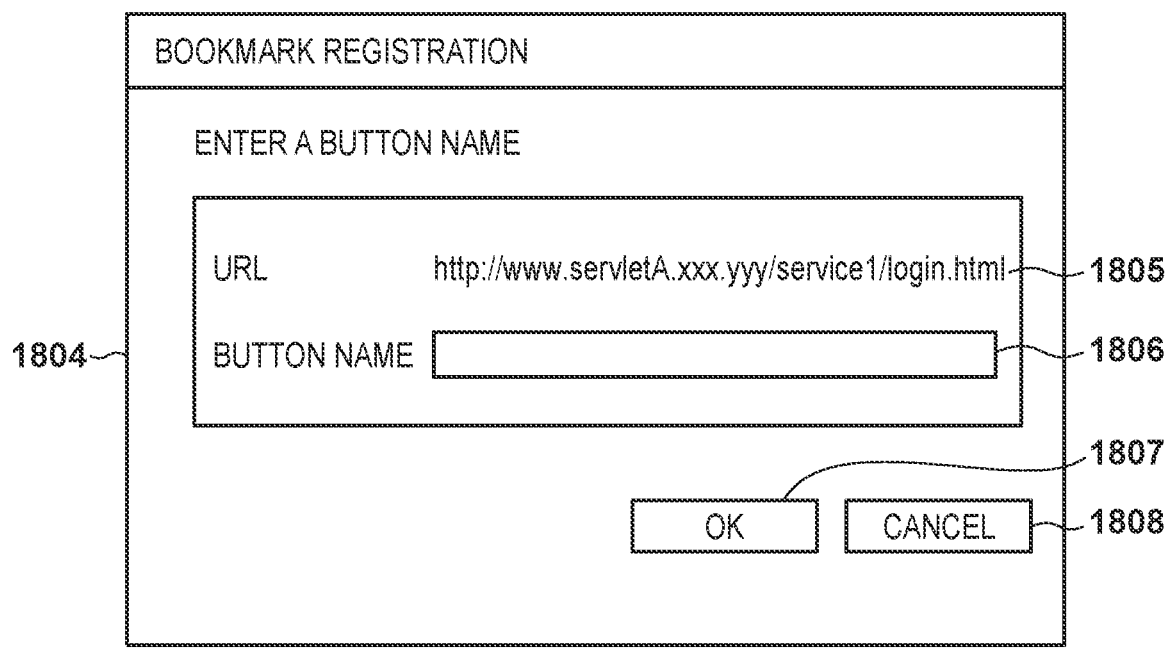

The MFP 101 includes the following elements as its software configuration. These elements are a button registration unit 401, a menu management unit 402, a login unit 403, an HTTP communication unit 404, a web browser 405, a script execution unit 406, a logged-in user management unit 407, a web browser monitoring unit 408, a button ID storage unit 409, an image forming unit 410, and an output unit 411. The button registration unit 401 registers GUI buttons in the menu management unit 402, which will be described later. In response to GUI buttons being registered in the menu management unit 402, the registered buttons are displayed in a menu screen. It is assumed that only an administrator of the MFP 101 registers the GUI buttons, and that user information of the administrator is pre-registered in the logged-in user management unit 407, which will be described later. A registration method will be described in detail with reference to FIGS. 18A and 18B. A screen displayed when the aforementioned administrator logs into the MFP 101 and displays the web browser 405 is assumed to be a login screen 1801, illustrated in FIG. 18A. The login screen 1801 includes an administrator toolbar 1802, which can only be used by the administrator, and the administrator toolbar 1801 includes a bookmark registration button 1803 through which the currently-displayed screen can be registered as a bookmark. It is assumed that the administrator toolbar is not displayed for users aside from the administrator. The screen transitions to a registration screen 1804, illustrated in FIG. 18B, upon the administrator pressing the bookmark registration button 1803. This registration screen 1804 can be accessed from other administrator-only screens as well, in addition to from the administrator toolbar 1802. A URL of the login screen 1801 is displayed in the registration screen 1804 in advance as a URL 1805, and a text box field 1806 for entering a button name is displayed as well. The administrator can add a GUI button to a main menu screen 1100, illustrated in FIG. 11A, by entering a button name into the text box field 1806 and pressing an OK button 1807. For example, a GUI button 1105 is added as indicated by a main menu screen 1104 in FIG. 11B in response to "Service1" being entered in the text box field 1806 and the OK button 1807 then being pressed. However, when a cancel button 1808 is pressed, no bookmark is registered, and the screen instead returns to the login screen 1801. When a bookmark is registered, the details thereof are added to a menu screen management table 1900, illustrated in FIG. 19A, which is held by the menu management unit 402. The details of the GUI buttons currently displayed in the main menu screen 1104 are held in the menu screen management table 1900. Column 1901 holds button IDs corresponding to the GUI buttons displayed in the main menu screen 1104. The button ID is assumed to be a unique value (character string) for identifying the button, and in the case of a button registered as a bookmark, identifiers such as 01 and 02 are appended to the end of a character string "WebBrowser", resulting in "WebBrowser01", "WebBrowser02", and so on.

The identifier is assumed to be incremented each time a button is registered. Column 1902 holds button names corresponding to the GUI buttons displayed in the main menu screen 1104. Column 1903 holds software modules to be launched when the GUI buttons displayed in the main menu screen 1104 are pressed.

The menu management unit 402 is a functional unit for displaying a menu screen for launching the various software modules (functional units) of the MFP 101. Graphical user interface (GUI) buttons for instructing a copy screen, a web browser screen (described later), and so on to be displayed are provided as a list. When a user manipulates (e.g. presses) a button, the corresponding software module (functional unit) is launched in response.

The login unit 403 accepts user information entered by a user when the user starts using the MFP 101 and carries out user authentication in order to identify the user operating MFP 101. Note that the entry of user information referred to here is accepted not through a web browser screen (described later), but rather through a screen displayed in the operation unit 219 on the basis of screen data held within MFP 101. A method in which the user types his or her user information using a software keyboard displayed in the operation unit 219, a method in which user information stored in a smartcard is read out, or the like may be used as the method for entering the user information. Although it is assumed here that the login unit 403 verifies the user information, a management server that manages a database of user information may be provided separately outside of the MFP 101, and the user information verification may be carried out on the management server side instead. When the user authentication is successful, the login unit 403 permits the user to use the MFP 101. The configuration may be such that other modules, e.g. the web browser monitoring unit 408, can refer to the user information (at least the user ID) of a logged-in user.

The HTTP (HyperText Transfer Protocol) communication unit 404 controls the network I/F 218 and carries out communication according to HTTP. The web browser 405 communicates with the web server 102 via the HTTP communication unit 404. Using a Uniform Resource Locator (URL) designated by the user through the operation unit 219, the web browser 405 issues a request for HTML data corresponding to that URL to a web application provided in the web server 102. The web browser 405 also receives HTML data (screen information) sent from the web application in response to the request, and displays a screen based on the received HTML data in the operation unit 219. Because the screen based on the received HTML data is a user interface for presenting information to the user and allowing the user to enter information, the HTML data may also be called "user interface information".

The script execution unit 406 can interpret and execute scripts (e.g. JavaScript™) loaded by the web browser 405, and manipulates content displayed in the web browser 405, executes communication using the HTTP communication unit 404, and so on. The logged-in user management unit 407 manages user information, such as the username and email address, of the user logged into the MFP 101 (the user authenticated by the login unit 403). The logged-in user management unit 407 also manages the functions of the MFP 101 that can be used by each user authenticated by the login unit 403, and can determine whether or not each function can be used (executed) on the basis of the authenticated user. In the present embodiment, the logged-in user management unit 407 determines, for each authenticated user, whether or not an autocomplete function of the web browser (an autocomplete process; described later) can be used. "Autocomplete function" refers to a function for displaying a given form in a screen with predefined data already entered therein. For example, an authentication screen is displayed with the username and password of the user currently using the MFP 101 already entered so that the user does not need to enter his or her username and password.

Figures 5, 6:
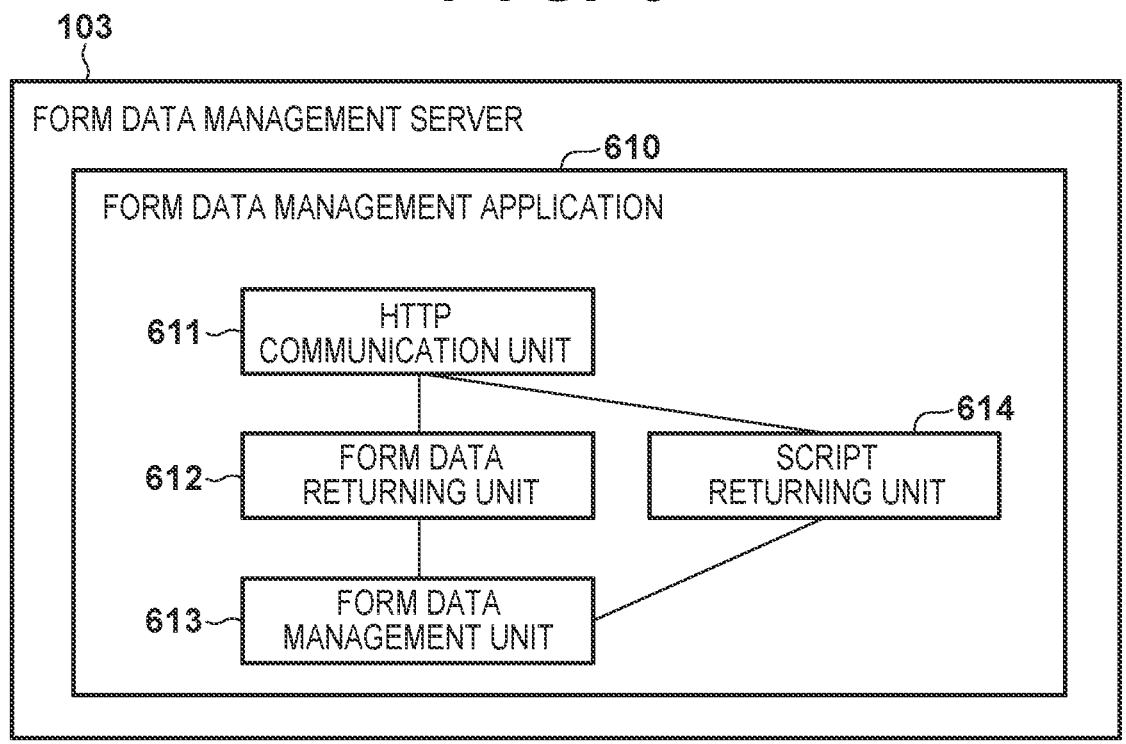
FIG. 5 is a diagram illustrating an example of a script that communicates, to a web browser monitoring unit 408, that a web browser 405 has finished loading HTML data.
FIG. 6 is a diagram illustrating the software configuration of a form data management server 103.

The web browser monitoring unit 408 receives a notification from the menu management unit 402 upon the user pressing a GUI button in the main menu screen 1104. Upon receiving the notification, the web browser monitoring unit 408 determines whether or not the pressed GUI button is a GUI button registered by the administrator of the MFP 101. If it is determined that the GUI button was registered by the administrator, the GUI button is subject to autocomplete, whereas if it is determined that the GUI button was not registered by the administrator, the GUI button is not subject to autocomplete. The web browser monitoring unit 408 also monitors the operations of the web browser 405. Specifically, the web browser monitoring unit 408 determines whether or not the web browser 405 has finished loading the HTML data, or finished displaying a screen. The web browser monitoring unit 408 also holds, in advance, a script, which will be described later with reference to FIG. 15, and automatically instructs the web browser 405 to load that script in response to operations of the web browser 405. Note that in the present embodiment, the web browser monitoring unit 408 is notified that a script (a first script), which will be described later using FIG. 5, has been executed and the loading of the HTML data is finished. Upon being notified that the loading of HTML data is finished, the web browser monitoring unit 408 instructs the script illustrated in FIG. 15 (a second script) to be loaded. FIG. 5 is an example of the script (the first script) that communicates, to the web browser monitoring unit 408, that the HTML data from the web browser 405 has finished loading. The script (JavaScript™) illustrated in FIG. 5 defines a notification to the web browser monitoring unit 408. Accordingly, a web application 810 (described later) embeds that script in the HTML data sent in response to a request from the web browser 405. By executing the script embedded in that HTML data, the web browser monitoring unit 408 can be notified by the web browser 405 that the HTML data has finished loading. At this time, by executing the script, the web browser 405 notifies the web browser monitoring unit 408 that the loading is finished, and furthermore communicates an argument added to a script tag. In other words, the web application 810 can control the autocomplete function to be executed as necessary by embedding that script in HTML data, for example. In this manner, the script defines the sequence of a series of processes carried out by the script execution unit 406 according to the present embodiment.

The button ID storage unit 409 holds a button ID management table 1904, illustrated in FIG. 19B, which is used when the web browser monitoring unit 408 determines whether or not a GUI button is a GUI button registered by the administrator. The data in the button ID management table 1904 is assumed to have been registered in advance. Column 1905 holds a button ID (WebBrowser) corresponding to the GUI button for displaying the web browser 405, and button IDs (WebBrowser01 and WebBrowser02) corresponding to GUI buttons registered by the administrator of the MFP 101 through the above-described method. Column 1906 holds values for determining whether or not the button is a button registered by the administrator. Buttons regis-tered by the administrator are indicated by "Yes", whereas buttons not registered by the administrator are indicated by "No". The data in the button ID management table 1904 illustrated in FIG. 19B may be updated at the same time as a menu screen button ID management table 1900, illustrated in FIG. 19A, is updated. The image forming unit 410 forms an image, and the output unit 411 carries out an output on the basis of the formed image.

Form Data Management Server Software Configuration

The software configuration of the form data management server 103 will be described next with reference to FIG. 6. The functional units illustrated in FIG. 6 are implemented by the CPU 311 of the form data management server 103 executing programs stored in the HDD 314 of the form data management server 103. Note that the form data management server 103 includes various types of functional units in addition to the functional units illustrated here. It is assumed that the form data management server 103 can be accessed using a domain name of "formdataserver.xxx.yyy".

A form data management application 610 includes an HTTP communication unit 611, a form data returning unit 612, a form data management unit 613, and a script returning unit 614. The form data management application 610 returns form data, scripts, and so on in response to a request from an apparatus on the LAN 110. The form data will be described later using FIG. 7. The HTTP communication unit 611 receives an HTTP request over the LAN 110, and sends information received from the form data returning unit 612, the script returning unit 614, or the like to the apparatus that sent the HTTP request as an HTTP response. The form data is data in which values entered into a form (e.g. entry fields) included in a user interface are associated with a URL, a username, an element name, and so on. In the present embodiment, the form data is used for autocomplete and thus may be called "supplementary information" as well.

The form data returning unit 612 carries out processing pertaining to the form data in response to a request from the exterior, received via the HTTP communication unit 611. Specifically, if, for example, a URL "https://formdataserver.xxx.yyy/loadService" has been accessed, the form data held in a form data management table (described later) is returned. If, for example, a URL "https://formdataserver.xxx.yyy/saveService" has been accessed, the form data is newly saved in the form data management table.

The script returning unit 614 returns a script in response to a request from the exterior received via the HTTP communication unit 611. Specifically, if, for example, a URL "https://formdataserver.xxx.yyy/js/main.js" has been accessed, the script returning unit 614 returns a script held in advance.

Form Data Management Table

A form data management table 700 held by the form data management unit 613 will be described next with reference to FIG. 7. A plurality of pieces of form data are defined in the form data management table 700. Column 701 holds URLs used by the web browser 405 of the MFP 101 to receive HTML data. Using these URLs, the form data is managed for each web application accessed by the web browser 405 of the MFP 101.

Figure 14A:
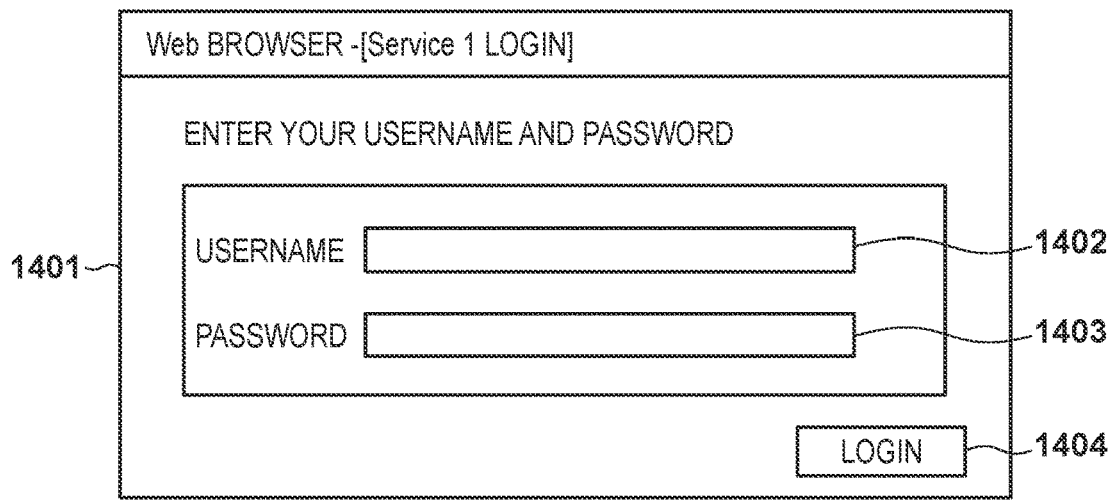
FIGS. 14A to 14F are diagrams illustrating screens in the MFP 101.

Column 702 holds the usernames of the users logged into the MFP 101. These users are authenticated by the login unit 403. Using these usernames, the form data is managed for each user operating the MFP 101. Column 703 holds the names of form elements included in the HTML data received by the web browser 405 of the MFP 101. Using these element names, the form data is managed for each type of form included in the HTML data received by the web browser 405 of the MFP 101. In the present embodiment, "form" refers to an entry form, through which user entries can be made, included in a screen displayed by the web browser 405 on the basis of the HTML data. The form corresponds to, for example, a text box field 1402 for entering a username, a password field 1403 for entering a password, and so on, which will be described later with reference to FIG. 14A. The form also corresponds to a text box field 1416 for entering a username, illustrated in FIG. 14C, a password field 1418 for entering a password, illustrated in FIG. 14D, and so on. Column 704 holds values to be entered in the form included in the HTML data received by the web browser 405 of the MFP 101 (i.e. values the form is to be filled with by the autocomplete function).

A situation in which a user having the username "user1" is logged into the MFP 101 and HTML data has been received using the URL "http://authappserver.xxx.yyy/service1/login.html", indicated in FIG. 7, will be described as an example. In this case, the element name "username" and the value "xxx" held in the record in the first row, and the element name "password" and the value "yyy" held in the record in the second row, are returned to the web browser 405. Accordingly, the web browser 405 displays, in the operation unit 219, a screen based on HTML data in which the value "xxx" is set in the form having the element name "username" included in the HTML data. Additionally, the web browser 405 displays, in the operation unit 219, a screen based on HTML data in which the value "yyy" is set in the form having the element name "password" included in the HTML data. The autocomplete function can be realized through this series of processes, and the burden on the user of the MFP 101 for manually entering the values "xxx" and "yyy" can be eliminated. On the other hand, for the username "user2", different URLs are set for the element name "email" and the element name "password". Accordingly, when user2 is logged in, a value corresponding to the form for the element names corresponding to each of the accessed URLs is returned to the web browser 405, and the values returned for each form are displayed. In this manner, information entered by the user earlier is saved in the form data in association with the entered user information.

Web Server and Authentication web Server Software Configuration

Figure 8A:
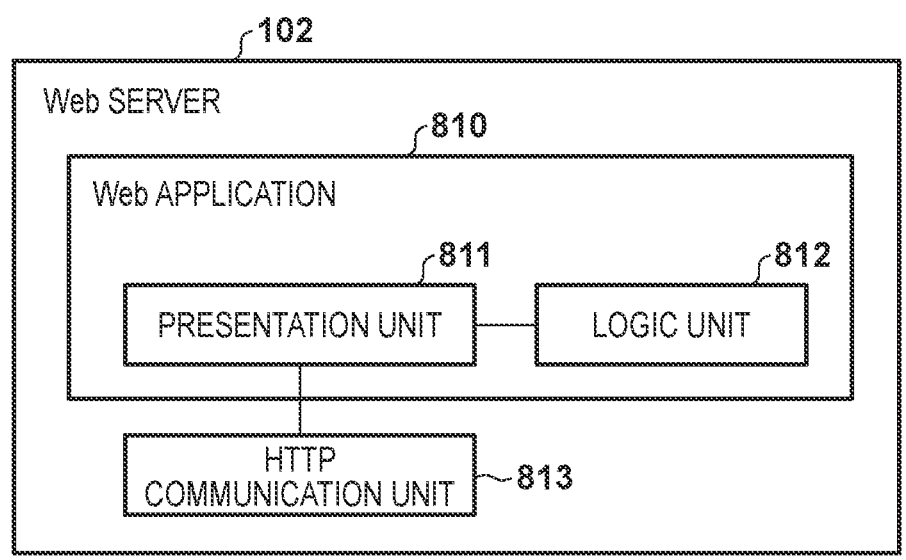
FIGS. 8A and 8B are diagrams illustrating the software configuration of the web server 102 and an authentication web server 104.

The software configuration of the web server 102 will be described next with reference to FIG. 8A. The functional units illustrated in FIG. 8A are implemented by the CPU 311 of the web server 102 executing programs stored in the HDD 314 of the web server 102. The web server 102 includes the web application 810 and an HTTP communication unit 813. The web application 810 includes a presentation unit 811 and a logic unit 812.

Figure 8B:
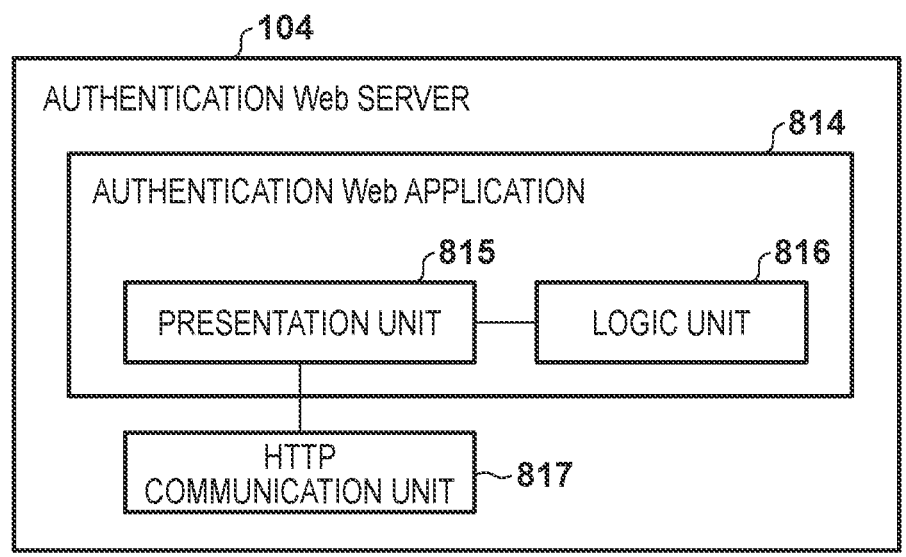

The software configuration of the authentication web server 104 will be described next with reference to FIG. 8B. The functional units illustrated in FIG. 8B are implemented by the CPU 311 of the authentication web server 104 executing programs stored in the HDD 314 of the authentication web server 104. The authentication web server 104 includes an authentication web application 814 and an HTTP communication unit 817. The authentication web application 814 includes a presentation unit 815 and a logic unit 816. The HTTP communication unit 817, the presentation unit 815, and the logic unit 816 have the same functions as the HTTP communication unit 813, the presentation unit 811, and the logic unit 812, respectively. Thus only the parts of the authentication web server 104 that are different from the web server 102 will be described here.

The web application 810 can embed, in the HTML data, a script (the first script) that notifies the web browser monitoring unit 408 that the HTML data has finished loading from the web browser 405. As a result, the web application 810 can control whether or not to apply the autocomplete function. The web application 810 also sends HTML data for displaying a screen that accepts instructions made by the user to the MFP 101, instructions for the MFP 101 to execute image processing, and so on.

The authentication web application 814 sends, to the MFP 101, HTML data for displaying a user information entry screen for accepting the entry of user information used to authenticate the user, in response to a request from the web browser 405 of the MFP 101. This HTML data contains the information of the form described above. By specifying a specific URL (specific screen information) defined in column 701 of FIG. 7, the web application 810 can control whether or not the autocomplete function is to be applied. The URL of an authentication web application 814 at a domain different from the web application 810 can be specified as well.

The presentation unit 811 provides HTML data to the web browser 405 of the MFP 101 via the HTTP communication unit 813. The presentation unit 811 also receives form data sent from the web browser 405, via the HTTP communication unit 813. The logic unit 812 carries out processing pertaining to the form data received via the presentation unit 811. In the present embodiment, the logic unit 812 carries out processing pertaining to user information sent from the web browser 405 as form data (entered manually by the user or using the autocomplete function in the screen displayed in the web browser 405). This processing is processing that, for example, verifies the user information against user information managed in advance in a database and then permits the web application 810 to be used if matching user information is present. If the web application 810 is permitted to be used, HTML data for displaying an operation screen of the web application 810 is returned to the web browser 405.

Monitoring Process

Figure 9A:
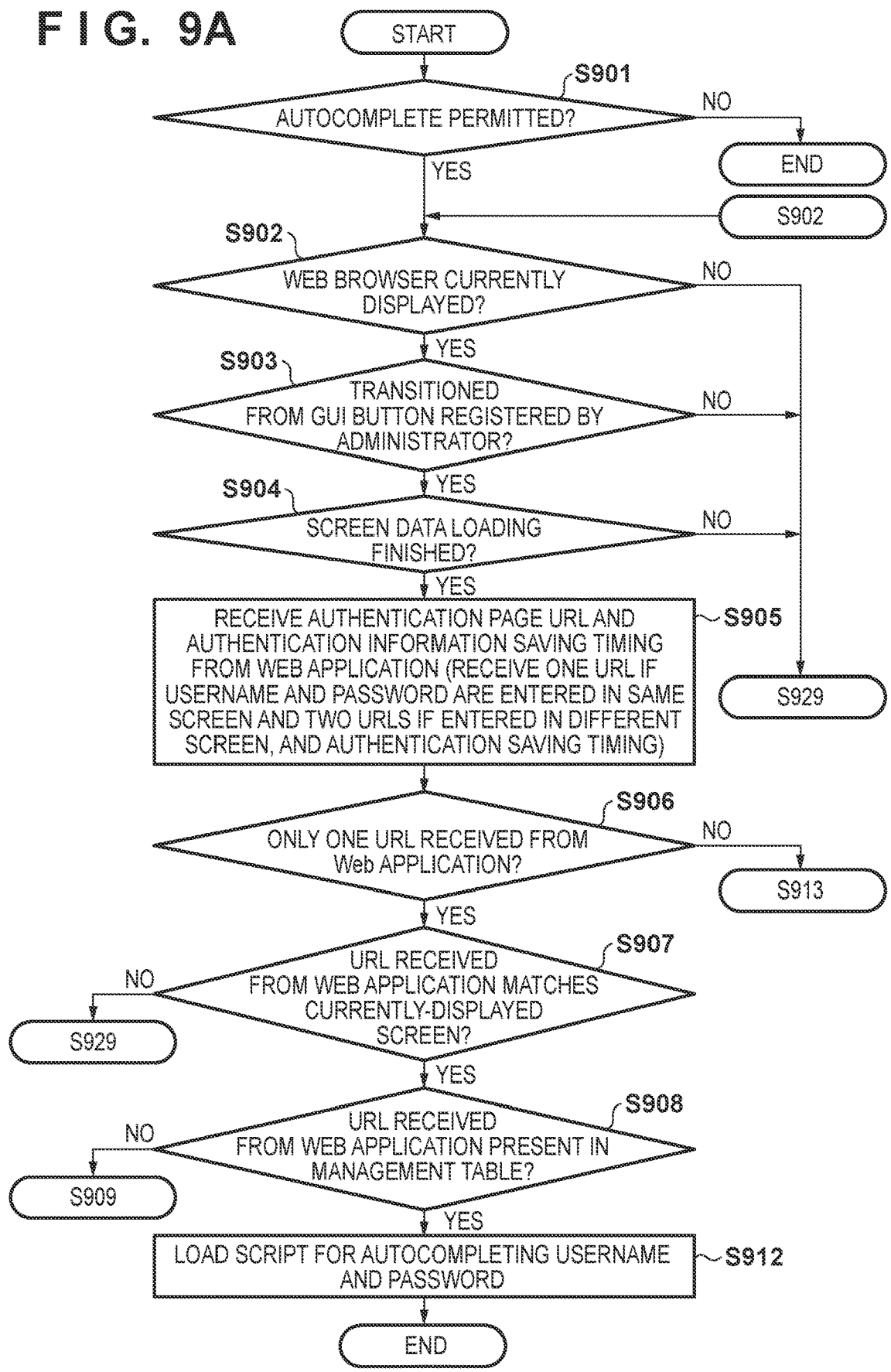
FIGS. 9A, 9B, and 9C are flowcharts illustrating operations carried out by the web browser monitoring unit 408.
Figure 9B:
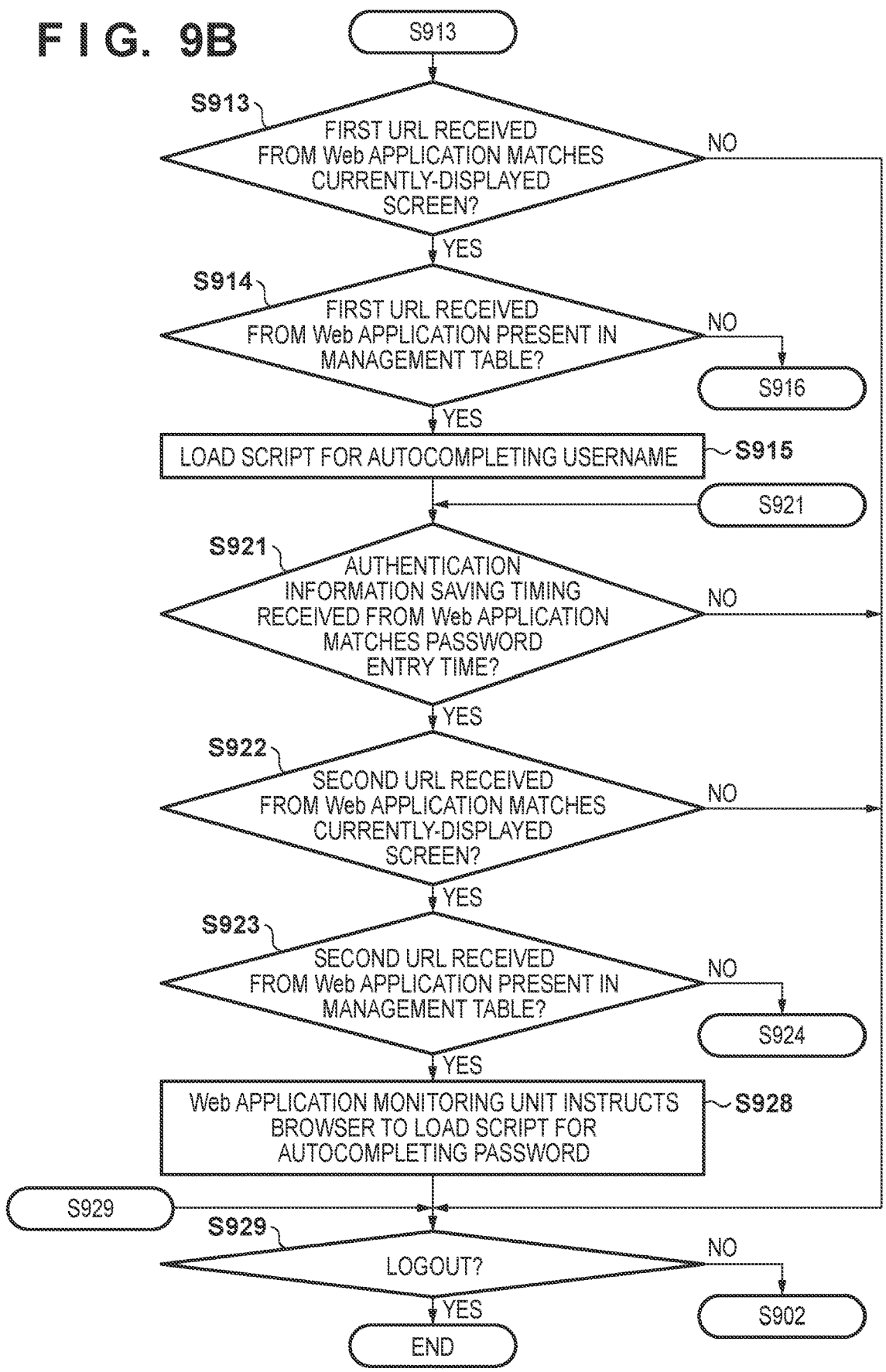
Figure 9C:
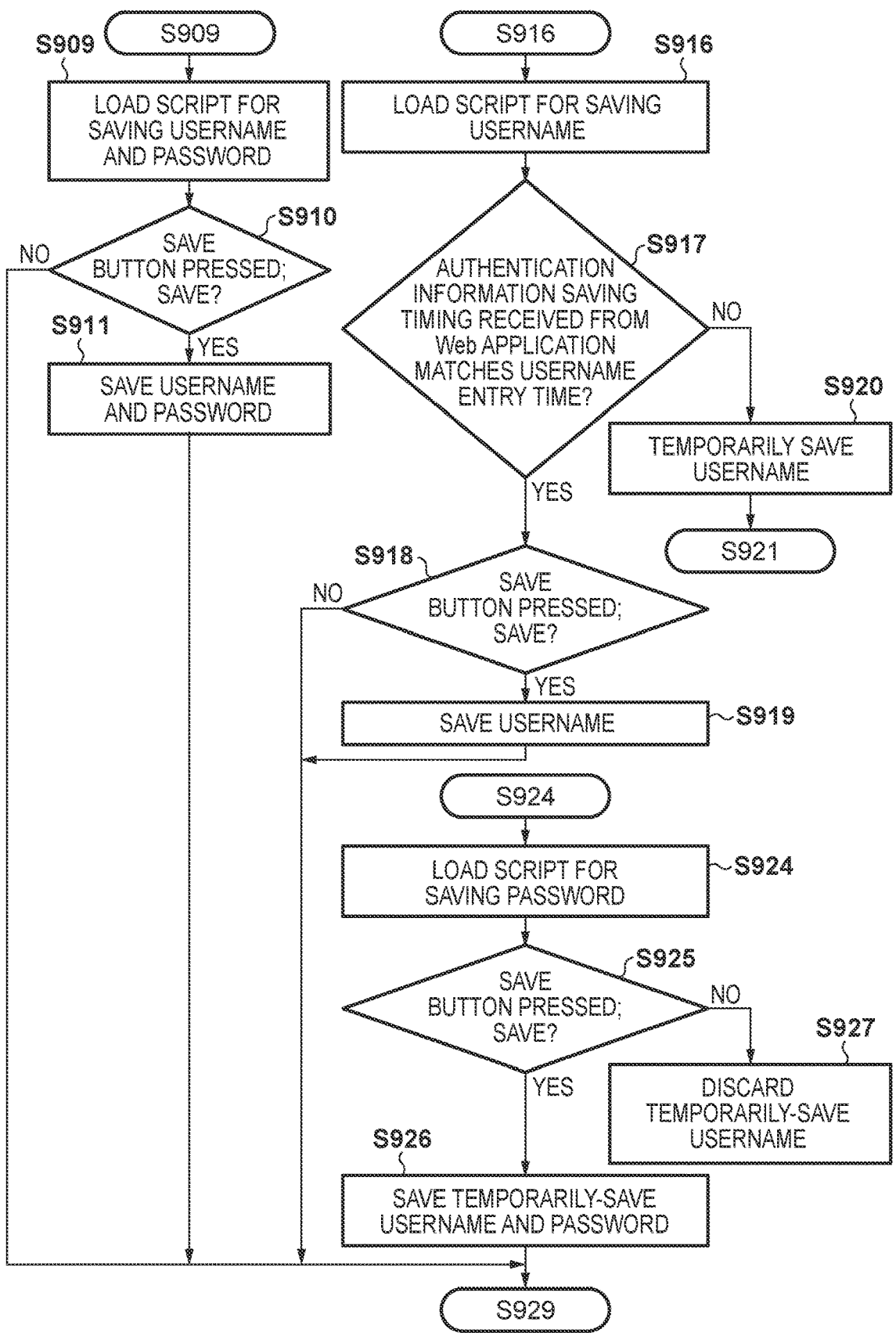

Processing carried out by the MFP 101, in which the web browser monitoring unit 408 monitors whether the web browser 405 has finished loading the HTML data and instructs the web browser 405 to load a script, will be described next with reference to FIGS. 9A to 9C. FIGS. 9A to 9C will be referred to collectively as "FIG. 9". The flowchart in FIG. 9 is executed upon the user authentication by the login unit 403 succeeding in the MFP 101 and the user permitted to use the autocomplete function then starting to use the MFP 101. Note that the operations (steps) in the flowchart of FIG. 9 are executed by the software modules of the MFP 101 illustrated in FIG. 4, and are all implemented by the CPU 211 of the MFP 101 executing control programs stored in the HDD 214. The software will be indicated as the executor in the following descriptions. "Using the MFP 101" refers to using a function provided by the MFP 101 through a web application, for example. In this case, authentication for using the web application is carried out, and the web application can only be used when that authentication succeeds. The sequence illustrated in FIG. 9 is an example of an authentication procedure for the web application. Although FIG. 9 focuses only on the authentication procedure, the MFP 101 can use a service provided by the web application once the authentication succeeds.

In S901, the web browser monitoring unit 408 makes an inquiry to the logged-in user management unit 407 and determines whether or not the user currently using the MFP 101 is permitted to use the autocomplete function. The logged-in user management unit 407 manages information indicating whether or not the autocomplete function is permitted to be used on a user-by-user basis, and the determination is made by, for example, searching the managed information using a user ID received from the CPU 211. The process moves to S902 if it is determined that the user is permitted to use the autocomplete function, whereas the process ends if it is determined that the user is not permitted to use the autocomplete function.

In S902, the web browser monitoring unit 408 determines whether or not the web browser 405 is currently displayed in the operation unit 219. This determination may be made on the basis of whether or not the web browser 405 is currently running, or whether or not the web browser 405 is displayed in the foreground of the operation unit 219. The process moves to S903 if it is determined that the web browser 405 is currently displayed, whereas the process moves to S929 if it is determined that the web browser 405 is not currently displayed.

In S903, the web browser monitoring unit 408 determines whether or not the currently-displayed web browser 405 has been transitioned to as a result of the administrator of the MFP 101 pressing a GUI button already registered in the menu management unit 402. When the user presses the GUI button, a notification is made from the menu management unit 402 to the web browser monitoring unit 408, and the button ID corresponding to the pressed GUI button is passed thereto at the same time. Here, the button ID passed to the web browser monitoring unit 408 is assumed to be a button ID 1901 stored in the menu screen button ID management table 1900 held by the menu management unit 402 illustrated in FIG. 19A. On the basis of the received button ID 1901, the web browser monitoring unit 408 refers to column 1905 in the button ID management table 1904 illustrated in FIG. 19B, held by the button ID storage unit 409, and verifies whether or not the same button ID is present. The process moves to S904 if a matching button ID is present and "button registered by administrator", in column 1906, is "Yes". The process moves to S929 if no matching button ID is present in column 1905. This is because autocomplete is not carried out if no matching button ID is present.

In S904, the web browser monitoring unit 408 determines whether or not there has been a notification that the web browser 405 has finished loading the HTML data. The web browser 405 has issued an HTTP request to a URL in response to the button being pressed, and thus in S905, it is determined whether or not the HTML data that is a response to that HTTP request has finished being loaded. The HTML data downloaded to the web browser 405 from the web server 102 is the HTML data illustrated in FIGS. 12A and 12B, for example. The HTML data includes script tags 1201 and 1202 and a redirect instruction 1203 in FIG. 12A. The HTML data includes script tags 1204 and 1205 and a redirect instruction 1206 in FIG. 12B. When the web browser 405 processes this HTML, the script 1201 or 1204 is executed and the web browser monitoring unit 408 is notified that the loading has finished. The process moves to S905 if it is determined that the HTML data has finished loading, whereas the process moves to S929 if it is determined that the HTML data has not finished loading.

In S905, if a form into which both a username and a password are to be entered is present in the screen subject to autocomplete, the web browser monitoring unit 408 receives a "URL of a screen including an entry form into which a username and password can be entered" designated by the script 1204. However, if the forms for entering the username and password are on different screens, the web browser monitoring unit 408 receives a "URL of a screen including an entry form into which a username can be entered", a "URL of a screen including an entry form into which a password can be entered", and a "timing at which to save authentication information", designated by the script 1202. This information is received as the loading of the HTML data finishes, a notification of which is made by the script 1201 or the script 1204 being executed. Note that when the forms for entering the username and password are on different screens, the web application 810 can display a save button in the screen, for saving the username when the username is entered, by setting a character string "user" as the above-described "timing at which to save authentication information". Likewise, a save button can be displayed in the screen, for saving both the username and password when the password is entered, by setting a character string "password" as the above-described "timing at which to save authentication information". This information is written in the HTML data loaded from the web server 102. If "user" is designated as the timing at which to save authentication information, a GUI button 1421, described later and illustrated in FIG. 14E, is displayed, and the username can be saved; and if "password" is designated, a GUI button 1425, described later and illustrated in FIG. 14F, is displayed, and the username and password can be saved. Furthermore, the "URL of a screen including an entry form into which a username and password can be entered", the "URL of a screen including an entry form into which a username can be entered", the "URL of a screen including an entry form into which a password can be entered", and the "timing at which to save authentication information" can also be set from an authentication information management screen 2000, described later and illustrated in FIG. 20A, that is provided by the web browser monitoring unit 408. In this case, the web browser monitoring unit 408 can obtain this information from the authentication information management screen 2000 without receiving the information from the web application.

In S906, it is determined whether or not only one URL has been received in S905. If it is determined that there is only one URL, it is assumed that the same screen includes the entry forms into which the username and password can be entered, and the process branches to S907. However, if it is determined that there is not only one URL, it is assumed that different screens include the entry forms into which the username and password can be entered, and the process branches to S913.

In S907, the web browser monitoring unit 408 determines whether or not the URL of the HTML data loaded by the web browser 405 matches the "URL of a screen including an entry form into which a username and password can be entered" received in S905. Note that the "URL of a screen including an entry form into which a username and password can be entered" is written in the script tag 1205, which will be described later with reference to FIG. 12B. This URL is also managed through the authentication information management screen 2000 provided by the web browser monitoring unit 408, described later and illustrated in FIG. 20A. The process moves to S908 if it is determined that the URLs match, whereas the process moves to S929 if it is determined that the URLs do not match. The HTML data determined to have finished loading in S904 may include the redirect 1206, which redirects to the UI screen for carrying out authentication for logging into the web server 102, for example. The HTML data of a screen for logging into the web server 102 is loaded in response to the execution of this redirect. If the URL of this HTML data matches the "URL of a screen including an entry form into which a username and password can be entered" received in S905, the process branches to S908. Note that the URL is information indicating the location of HTML data and the like, and thus may also be called "location information".

In S908, the web browser monitoring unit 408 determines whether or not the "URL of a screen including an entry form into which a username and password can be entered" is present in the management table 700 illustrated in FIG. 7, which is managed by the form data management server 103. The process moves to S912 if it is determined that the URL is present, whereas the process moves to S909 if it is determined that the URL is not present. The URL being determined to be present in the management table 700 indicates that a username and/or password used in autocomplete is saved in the management table 700. The web browser monitoring unit 408 may request the form data management application 610 to make this determination, for example.

In S909, the web browser monitoring unit 408 instructs the web browser 405 to load the scripts held in the web browser monitoring unit 408, making it possible for the username and password to be saved, in order to carry out the autocomplete function (described later). A GUI button 1412, illustrated in FIG. 14B, is also displayed.

Figure 14B:
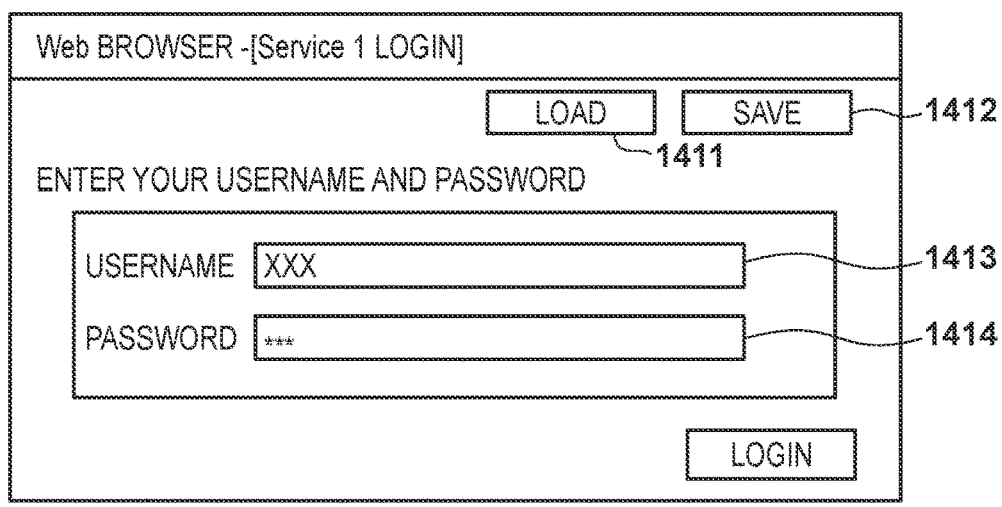

In S910, the web browser 405 determines whether or not the user has pressed the GUI button 1412 illustrated in FIG. 14B. If it is determined that the button has been pressed, the process moves to S911, and the username and password are saved. The username and password are saved in the management table 700, for example, in association with a corresponding URL, username, and element name. The process moves to S929 if it is determined that the button has not been pressed. The user information is saved in the form data management unit 613 of the form data management server 103 in response to the execution of the script, for example.

In S912, the web browser monitoring unit 408 autocompletes (presets) a username "xxx" and a password "yyy" in the text box field 1402 and the text box field 1403 illustrated in FIG. 14A by instructing the web browser 405 to load the scripts held in the web browser monitoring unit 408, in order to carry out the autocomplete function (described later).

In S913, the web browser monitoring unit 408 determines whether or not the URL of the HTML data loaded by the web browser 405 matches the "URL of a screen including an entry form into which a username can be entered" received in S905. Note that the "URL of a screen including an entry form into which a username can be entered" is the first argument written in the script tag 1202, which will be described later with reference to FIG. 12A. This URL is also managed through the authentication information management screen 2000 provided by the web browser monitoring unit 408, described later and illustrated in FIG. 20A. The process moves to S914 if it is determined that the URLs match, whereas the process moves to S929 if it is determined that the URLs do not match. The HTML data determined to have finished loading in S904 may include the redirect 1203, which redirects to the UI screen for carrying out authentication for logging into the web server 102, for example. The HTML data of a screen for logging into the web server 102 is loaded in response to the execution of this redirect. If the URL of this HTML data matches the "URL of a screen including an entry form into which a username can be entered" received in S905, the process branches to S914. Note that the URL is information indicating the location of HTML data and the like, and thus may also be called "location information".

In S914, the web browser monitoring unit 408 determines whether or not the "URL of a screen including an entry form into which a username can be entered" is present in the management table 700 illustrated in FIG. 7, which is managed by the form data management server 103. The process moves to S915 if it is determined that the URL is present, whereas the process moves to S916 if it is determined that the URL is not present. The URL being determined to be present in the management table 700 indicates that a username used in autocomplete is saved in the management table 700. The web browser monitoring unit 408 may request the form data management application 610 to make this determination, for example.

In S915, the web browser monitoring unit 408 instructs the web browser 405 to load a script (the second script) for autocomplete, saved in the web browser monitoring unit 408, in order to carry out the autocomplete function (described later). A username "zzz@zzz.com" is autocompleted (preset) in a text box field 1422, illustrated in FIG. 14E, in response to the second script being downloaded and executed.

In S916, the web browser monitoring unit 408 instructs the web browser 405 to load the scripts held in the web browser monitoring unit 408, making it possible for the username to be saved, in order to carry out a process for saving the form data (described later). The GUI button 1421, illustrated in FIG. 14E, is also displayed.

In S917, the web browser monitoring unit 408 determines whether or not the character string set as the "timing at which to save authentication information" received in S905 is "user" (designating that the save button is to be displayed when the username is entered). If it is determined that the character string is "user", the process moves to S918, whereas if it is determined that the character string is not "user", the process moves to S920 and the username is temporarily saved. The process then moves to S921.

In S921, the web browser monitoring unit 408 determines whether or not the character string set as the "timing at which to save authentication information" received in S905 is "password" (designating that the save button is to be displayed when the password is entered). If it is determined that the character string is "password", the process moves to S922, whereas if it is determined that the character string is not "password", the process moves to S929.

In S922, the web browser monitoring unit 408 determines whether or not the URL of the HTML data loaded by the web browser 405 matches the "URL of a screen including an entry form into which a password can be entered" received in S905. In other words, it is determined whether a screen including an entry form into which a password can be entered is being displayed. Note that the "URL of a screen including an entry form into which a password can be entered" is the second argument written in the script tag 1202, which will be described later with reference to FIG. 12A. This URL is also managed through the authentication information management screen 2000 provided by the web browser monitoring unit 408, described later and illustrated in FIG. 20A. The process moves to S923 if it is determined that the URLs match, whereas the process moves to S929 if it is determined that the URLs do not match.

In S923, the web browser monitoring unit 408 determines whether or not the "URL of a screen including an entry form into which a password can be entered" is present in the management table 700 illustrated in FIG. 7. The process moves to S928 if it is determined that the URL is present, whereas the process moves to S924 if it is determined that the URL is not present. The URL not being present in the management table indicates that a password for autocomplete is not saved.

In S924, the web browser monitoring unit 408 instructs the web browser 405 to load the scripts held in the web browser monitoring unit 408, making it possible for the password to be saved, in order to carry out a process for saving the form data (described later). A save button 1425, illustrated in FIG. 14F, is also displayed.

In S925, the web browser 405 determines whether or not the user has pressed the save button 1425 illustrated in FIG. 14F. If it is determined that the button has been pressed, the process moves to S926, and the username and password temporarily saved in S920 are saved in the management table 700 of the form data management server 103, for example. However, if it is determined that the button has not been pressed, the process moves to S927, where the username temporarily saved in S920 is discarded.

If it is determined in S923 that the URL is present in the management table 700, in S928, the web browser monitoring unit 408 instructs the web browser 405 to load the scripts held in the web browser monitoring unit 408 in order to carry out the autocomplete function (described later). As a result, the loaded scripts are executed and a password "zzzzzzz" is autocompleted (preset) in a text box field 1426, illustrated in FIG. 14F. Although the script in the above-described S915 differs from that subject to autocomplete, the script is the same in terms of the autocomplete being carried out.

In S929, the web browser monitoring unit 408 determines whether or not the user has logged out of the MFP 101. If the user has logged out, the process ends, whereas if the user has not logged out, the process returns to S902.

Through the sequence described above, autocomplete can be carried out by copying stored values to the respective forms having confirmed that the entry screens (URLs) for the username and password are displayed, regardless of whether the entry screens are the same screen or different screens. If autocomplete is permitted, the user information that has been entered, such as a username and password, can be stored and then used for the autocomplete. Note that in the sequence illustrated in FIG. 9, the username and/or password are not saved when autocomplete is carried out. However, in this case too, the username and/or password saved in the management table 700 may be updated to the respective values that have been entered.

Autocomplete Function

The autocomplete function according to the present embodiment will be described next with reference to FIGS. 10A and 10B. When a user (username "user1"; assumed to be a user for which autocomplete is permitted) logs into the MFP 101, first, a menu screen is displayed in the operation unit 219 by the menu management unit 402. FIG. 11A illustrates a menu screen 1100 displayed by the menu management unit 402. A GUI button 1101 for instructing the use of a copy application, a GUI button 1102 for instructing the use of a fax application, and a GUI button 1103 for instructing the use of the web browser 405 are displayed in the menu screen 1100. Note that the copy application and the fax application are applications installed within the MFP 101, and the web browser 405 is not used when these applications are used. However, these applications can also be operated as web applications provided by the web server 102.

Figure 11A:
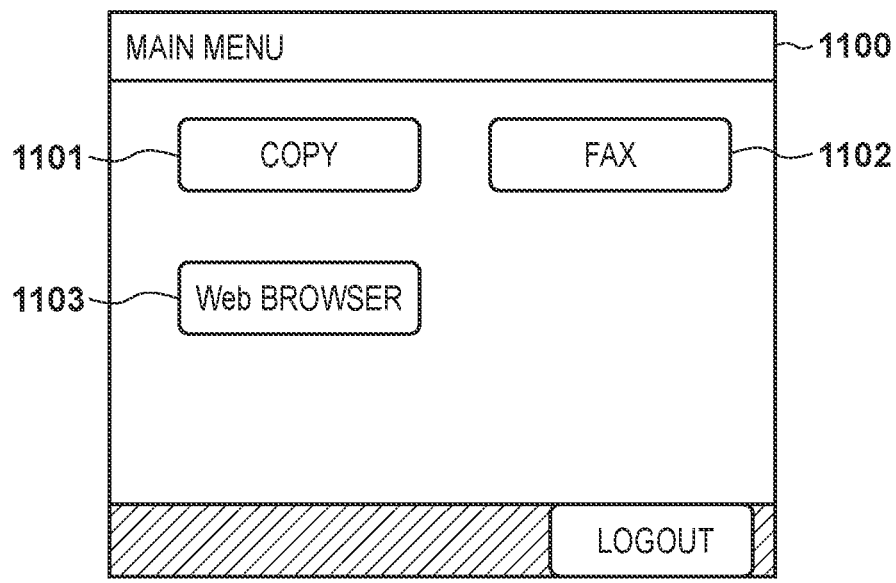
FIGS. 11A and 11B are diagrams illustrating screens in the MFP 101.
Figure 11B:
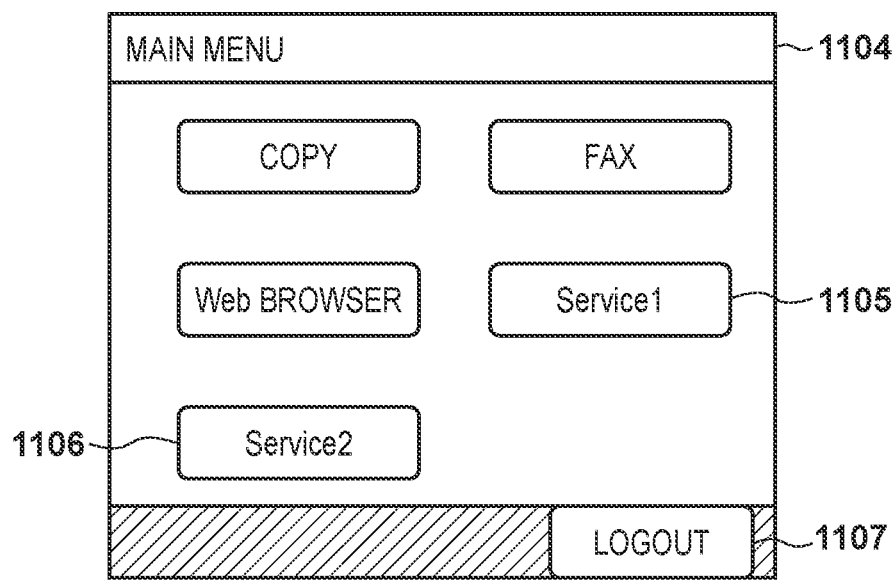

A menu screen 1104 illustrated in FIG. 11B is a screen displayed when the administrator of the MFP 101 has pressed the GUI button 1103 of the menu screen 1100, displayed the web browser 405, and registered a GUI button in the button registration unit 401 through the above-described method (bookmark registration). The names of the GUI buttons registered in the button registration unit 401 are assumed to be Service1 and Service2. The GUI buttons 1105 and 1106 are GUI buttons for instructing the use of respective web applications provided in the web server 102 on the LAN 110. A GUI button 1107 is a GUI button for logging the user out of the web application. Different URLs are assigned to the GUI buttons 1105 and 1106. Here, it is assumed that a URL corresponding to the web application 810 is associated with the GUI button 1105.

Figure 10A:
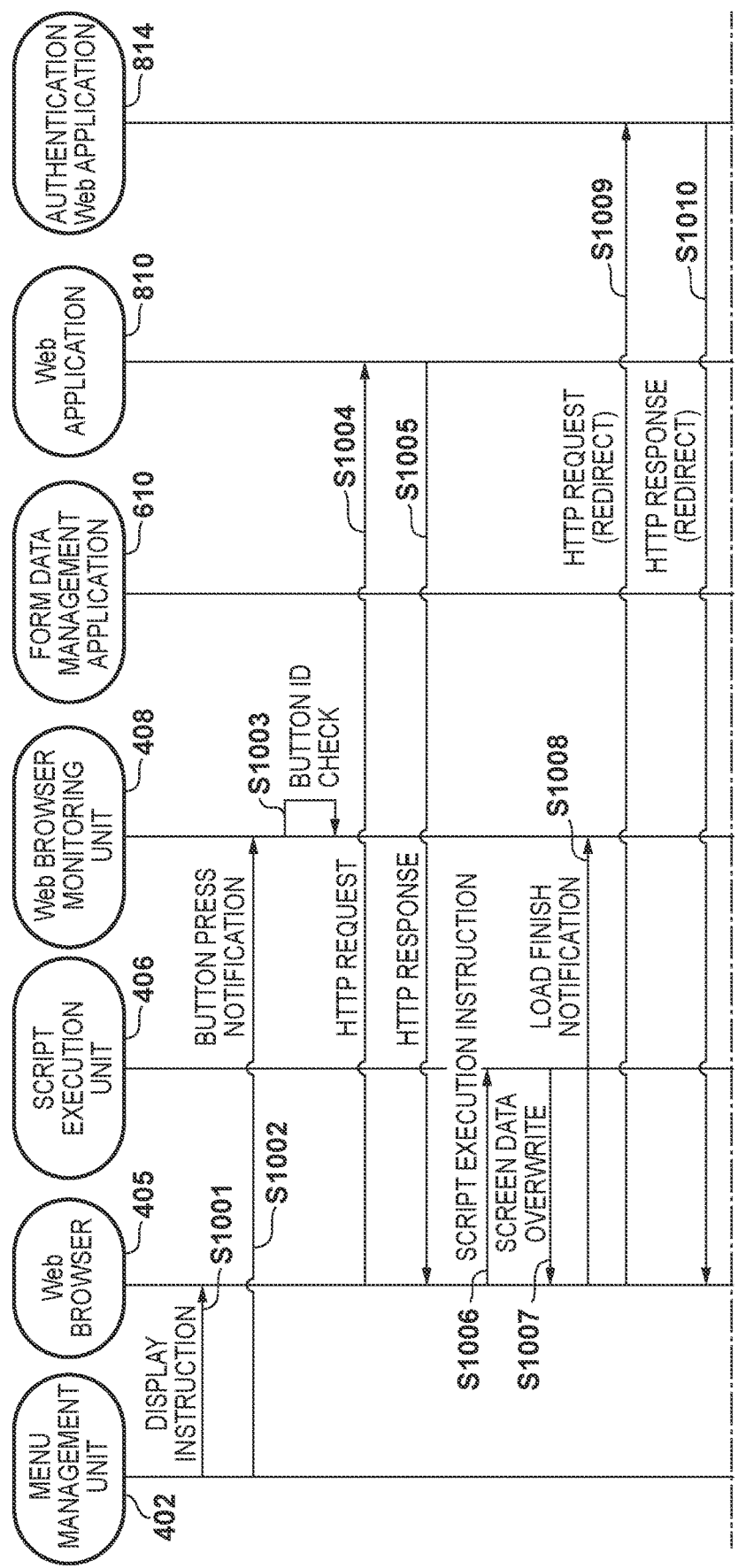

When the GUI button 1105 is pressed (manipulated), in S1001 of FIG. 10A, the menu management unit 402 launches the web browser 405 and carries out control so that the web browser 405 is displayed in the foreground of the operation unit 219. The menu management unit 402 also instructs the web browser 405 to issue a request for HTML data to the web application 810 using the URL associated with the GUI button 1105.

In S1002, the menu management unit 402 notifies the web browser monitoring unit 408 that the GUI button 1105 has been pressed. At the time of this notification, the button ID stored in column 1901 of the above-described menu screen button ID management table 1900 held by the menu management unit 402 is passed to the web browser monitoring unit 408. Here, the button ID of the GUI button 1105 is assumed to be "WebBrowser01".

In S1003, the web browser monitoring unit 408 determines whether or not a transition has been made from a GUI button registered by the administrator of the MFP 101, through the determination method described above with reference to S903. If it is determined that the GUI button was registered by the administrator, the process of S1005 (described later) is carried out, and the process then moves to S1006. However, if it is determined that the GUI button was not registered by the administrator, the processes of S1006 and onward (described later) are not carried out.

In S1004, the web browser 405 issues a request for HTML data to the web application 810 in accordance with an instruction from the menu management unit 402. In S1005, the web application 810 returns (sends) HTML data for displaying a top screen of the web application 810 to the web browser 405.

FIGS. 12A and 12B illustrate the HTML data returned by the web application 810 in S1005 (obtainment request response data). In other words, this is the HTML data confirmed to have finished loading in S904 of FIG. 9. Although the screen data according to the present embodiment is assumed to be written in HTML format, for the sake of simplicity, stylesheet settings and so on will not be described here.

In FIGS. 12A and 12B, the script tag 1201 and the script tag 1204 are the scripts illustrated in FIG. 5 for notifying the web browser monitoring unit 408 that the web browser 405 has finished loading the HTML data. The script tag 1202 passes, to the function of the script of the script tag 1201, the "URL of a screen including an entry form that can be entered by a user" as the first argument, the "URL of a screen including an entry form into which a password can be entered" as the second argument, and the "timing at which to save authentication information" as the third argument, and executes the script of the script tag 1201. Here, the "timing at which to save authentication information" is information for specifying whether to display the save button in the screen when the username is entered so that the username can be saved or display the save button in the screen when the password is entered so that the username and the password can be saved. In the example of FIG. 12A, up to the third argument is specified in the script tag 1202. The script tag 1205 is a script that executes the script of the script tag 1204 having passed, to the function of the script of the script tag 1204, the "URL of a screen including an entry form that can be entered by a user" as an argument. In other words, if the username and password are entered in different screens, HTML data such as that illustrated in FIG. 12A is used, whereas if the username and password are entered in the same screen, HTML data such as that illustrated in FIG. 12B is used.

Figure 20A:
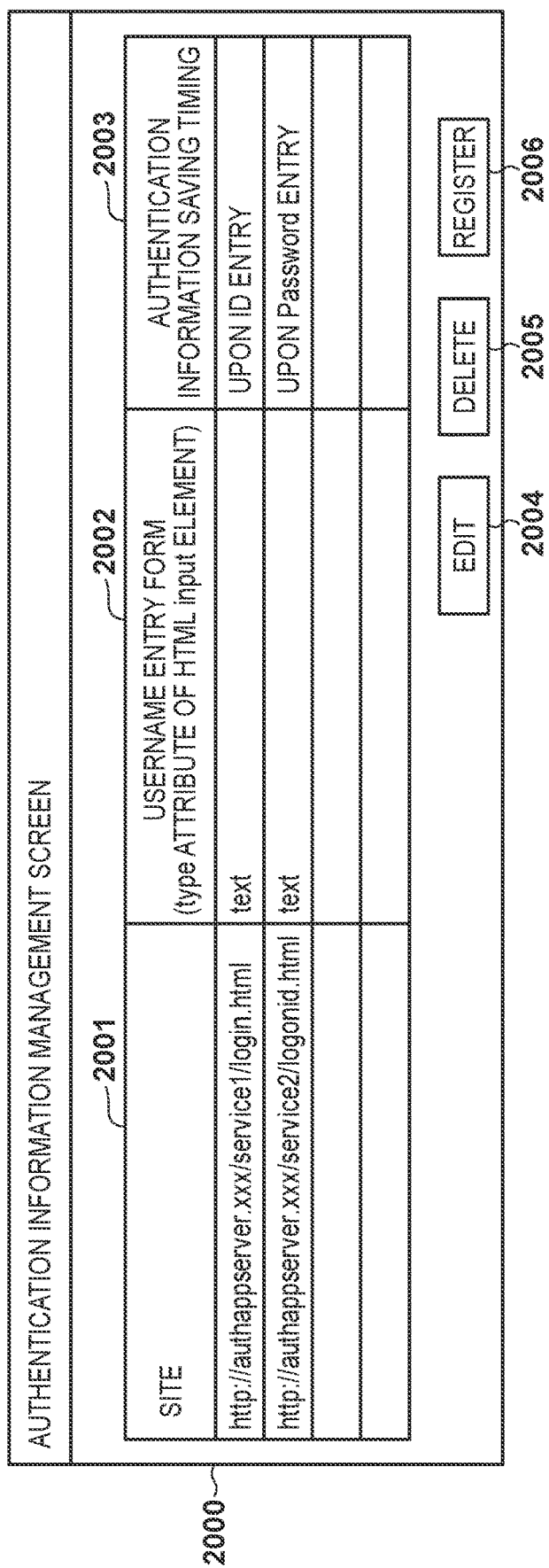

A meta tag 1203 is a tag for redirecting to the "URL of a screen including an entry form that can be entered by a user" (an authentication web server that is the redirect destination). A meta tag 1206 is a tag for redirecting to the "URL of a screen including an entry form that can be entered by a user" (an authentication web server that is the redirect destination). The information of the arguments in the script of the script tag 1202 and the script of the script tag 1205 can also be specified from the authentication information management screen 2000 illustrated in FIG. 20A, provided by the web browser monitoring unit 408 (a screen configured by a Java servlet or the like, accessible only by the administrator of the multifunction peripheral). Column 2001 holds a site (URL), column 2002 holds a username entry form (the "type" attribute of the "input" element in the HTML data), and column 2003 holds an authentication information save timing. Two records corresponding to information that has already been registered are displayed in the authentication information management screen 2000 as an example. When already-registered information is to be edited, the editing is assumed to be carried out in an authentication information management screen 2007 illustrated in FIG. 20B, which is transitioned to when the desired record is selected and an edit button 2004 is pressed. When already-registered information is to be deleted, the information is deleted by selecting the desired record and pressing a delete button 2005. When new information is to be registered, the registration is carried out through the authentication information management screen 2007 illustrated in FIG. 20B, which is transitioned to when a register button 2006 is pressed. In the management screen 2007 illustrated in FIG. 20B, the URL and type attributes, which serve as script parameters, can be designated, the save timing set, and these items newly registered.

S1006 is executed when the web browser 405 loads the HTML data from the web application 810 and finishes displaying the screen. In S1006, the web browser 405 instructs the script execution unit 406 to execute the scripts written in the script tags 1201 and 1202 included in the loaded HTML data. As a result of the scripts of the script tags 1201 and 1202 being executed, in S1007, the script execution unit 406 adds a script tag 501, illustrated in FIG. 5, to the HTML data loaded by the web browser 405, and overwrites the screen data. The script tag 501 is a script tag in which a URL serving as the argument thereof is linked as a query by the script 1202, and is embedded in the HTML data. The script embedded in the HTML data is executed by the web browser 405, and notifies the web browser monitoring unit 408 that the HTML data is finished loading. Additionally, an argument passed by the script 1202 (the URL of an authentication screen or the like) is passed to the web browser monitoring unit 408. The user information of the user logged into the MFP 101 may be passed along at this time as well. Specifically, before adding the character string 501 illustrated in FIG. 5 to the HTML data, the argument passed from the script tag 1202, e.g. "URL of a screen including an entry form that can be entered by a user (first argument)", is added to the character string 501. Note that it is also possible to add a URL managed through the authentication information management screen 2000 illustrated in FIG. 20A, which is provided by the web browser monitoring unit 408. In S1008, the web browser 405 executes the script embedded in the HTML data and notifies the web browser monitoring unit 408 that the loading is finished.

In S1009, the web browser 405 issues a request for HTML data to the authentication web application 814, which is the destination of the redirect from the web application 810, in accordance with the meta tag 1203. In S1010, the authentication web application 814 returns (sends), to the web browser 405, HTML data for displaying the user information entry screen for accepting the entry of the user information to be used to authenticate the user.

FIG. 13 illustrates the HTML data returned by the authentication web application 814 in S1010. Note that if the HTML data does not include a form for entering a password, and only includes a form for entering a username, an input tag 1302 illustrated in FIG. 13 is not written therein. Furthermore, the displayed message only prompts the entry of a user ID. Although the screen data according to the present embodiment is assumed to be written in HTML format, for the sake of simplicity, stylesheet settings and so on will not be described here.

Figure 14C:
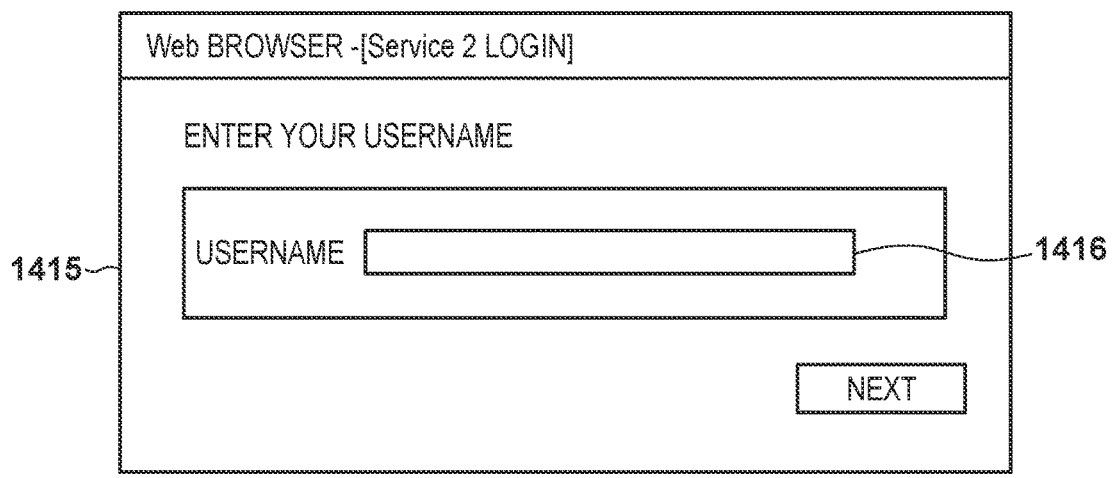
Figure 14D:
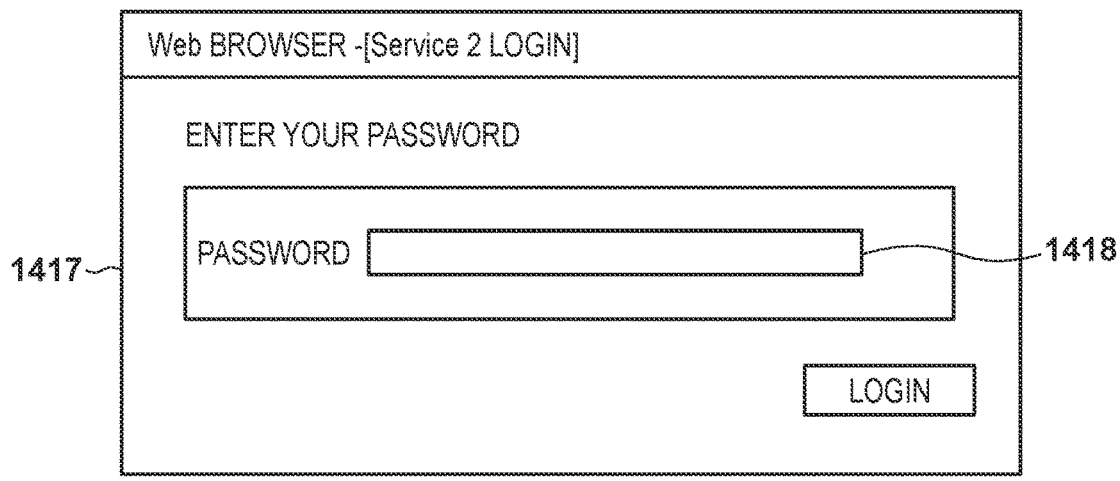
Figure 14E:
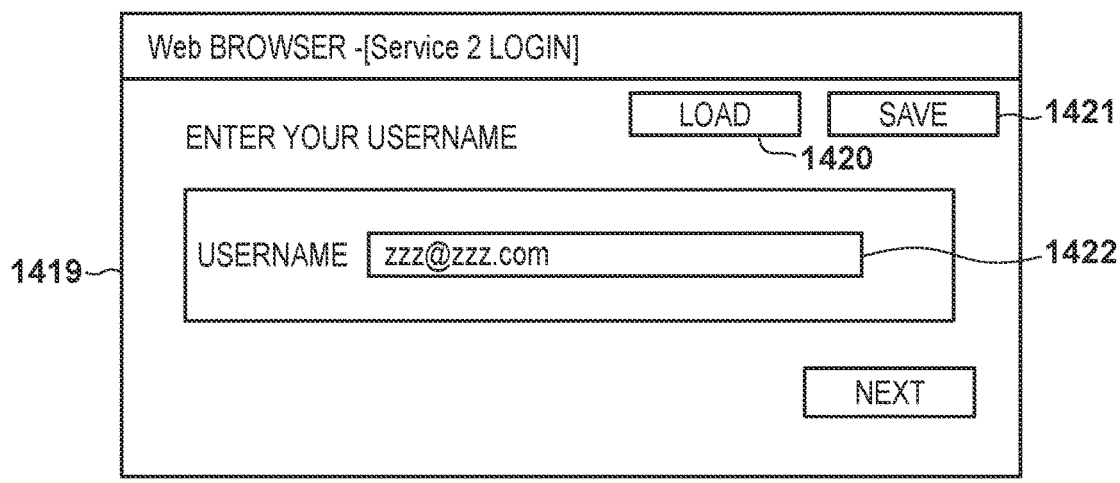
Figure 14F:
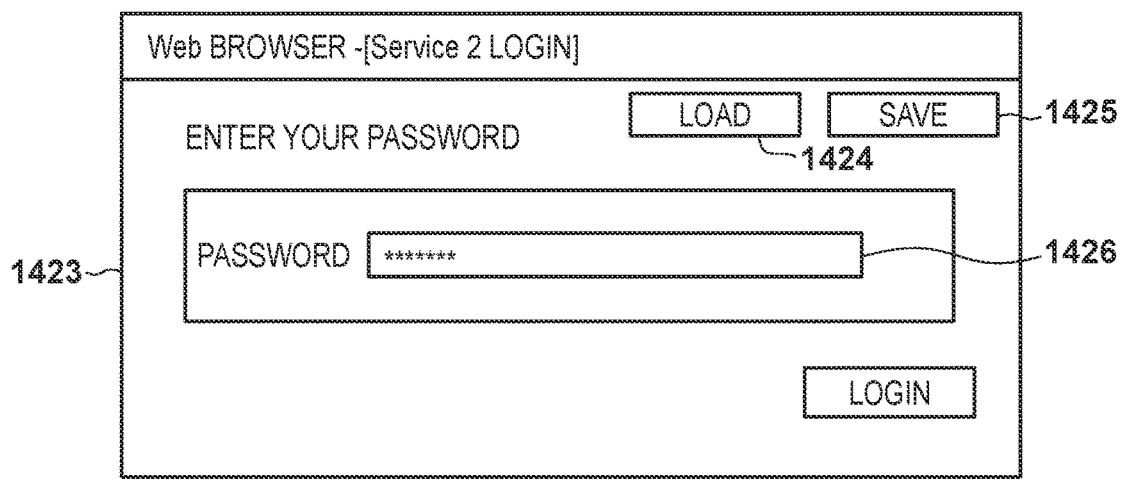

FIG. 14A illustrates a screen displayed in the web browser 405 on the basis of the HTML data illustrated in FIG. 13. The text box field 1402, for entering the username, is displayed in a GUI screen 1401 on the basis of an input tag 1301. The password field 1403, for entering the password, is displayed on the basis of the input tag 1302. Additionally, a GUI button 1404 for logging in using the username entered into the text box field 1402 and the password entered into the password field 1403 is displayed on the basis of an input tag 1303. If the username and password are entered using different screens, the text box field 1416, for entering the username, is displayed in a GUI screen 1415, illustrated in FIG. 14C, on the basis of the input tag 1301, in order to enter the password. The password field 1418, for entering the password, is displayed in a GUI screen 1417 illustrated in FIG. 14D, on the basis of the input tag 1302. In this case, the following messages are exchanged, for example. The user ID that has been entered is passed to the authentication web server 104 when the "next" button illustrated in FIG. 14C is pressed. Additionally, a request for HTML data is issued to the URL for entering the password specified in the HTML data for entering the user ID. The HTML data returned in response to this request corresponds to a screen for entering the password; the password is entered in that screen and sent to a destination such as the authentication web server. During this entry, if there is data such as a corresponding URL or a user ID, password, or the like of the user, autocomplete is carried out using that data.

On the other hand, the web browser monitoring unit 408 executes S1011 in response to the notification that the loading is finished made in S1008. In S1011, the web browser monitoring unit 408 first determines whether a "URL used to receive the HTML data currently loaded by the web browser 405" and the "URL of a screen including an entry form that can be entered by a user (first argument)" match. This corresponds to S906 in FIG. 9. The "URL of a screen including an entry form that can be entered by a user (first argument)" corresponds to the "URL of a screen including an entry form in which a username and password can be entered" or the "URL of a screen including an entry form in which a username can be entered", included in the script tag 1202, and is communicated to the web browser monitoring unit 408 in response to the script 1201 being executed. Note that a URL managed through the authentication information management screen 2000 illustrated in FIG. 20A, which is provided by the web browser monitoring unit 408, may be used as well. The process moves to S1012 if it is determined that the URLs match. However, if it is determined that the URLs do not match, the process of S1011 is repeated after a set amount of time has passed. If the process of S1011 is repeated and it is determined that the URLs match, the web browser monitoring unit 408 instructs the web browser 405 to load the script illustrated in FIG. 15 as an example.

Upon the web browser monitoring unit 408 instructing the web browser 405 to load the script in S1011, the process moves to S1012.

FIG. 15 illustrates an example of a script through which the web browser monitoring unit 408 instructs the web browser 405 to load data. Although FIG. 15 includes linebreaks for the sake of simplicity, the character string actually does not include linebreaks or spaces. The script illustrated in FIG. 15 defines a URL of the script tag 1501 being added to HTML data as an external script (that is, overwriting the screen data). The URL of the script tag 1501 links the "URL used to receive the HTML data currently loaded by the web browser 405" and a "username of the user currently logged into the MFP 101" as queries to a "URL of the script returning unit 614".

The "URL of the script returning unit 614" is information held by the web browser monitoring unit 408 in advance. The "URL used to receive the HTML data currently loaded by the web browser 405" and the "username of the user currently logged into the MFP 101" are information determined dynamically in accordance with the state of the MFP 101. The web browser 405 may notify the web browser monitoring unit 408 of these values when making the notification that the loading is finished in S1008, for example. Note that it is desirable that content for ensuring that the same script is not loaded two or more times in the same HTML data be written in the script illustrated in FIG. 15.

In S1012, the web browser 405 instructs the script execution unit 406 to execute the script instructed to be loaded by the web browser monitoring unit 408. The script execution unit 406 executes the script illustrated in FIG. 15 in response to this instruction.

As described above, the overwriting of the HTML data is defined in the script illustrated in FIG. 15. As such, when the script execution unit 406 executes the script, in S1014, the script tag 1501 is added to the HTML data loaded by the web browser 405, and the screen data is overwritten.

In S1015, the web browser 405 issues a request for a script (the second script) to the form data management application 610 in response to the script tag being added in S1014. This request includes information indicating the "URL used to receive the HTML data currently loaded by the web browser 405" and information indicating the "username of the user currently logged into the MFP 101", as indicated by the script tag 1501.

In S1016, the script returning unit 614 of the form data management application 610 returns the script the web browser 405. At this time, the script returning unit 614 accesses the form data management table held by the form data management unit 613 and determines the row corresponding to the "URL" and the "username" included in the query character string. This is the information in column 701 and column 702 illustrated in FIG. 7, for example.

The script returning unit 614 issues an ID for accessing the determined row (that is, the form data) to the form data management unit 613. It is assumed here that "0123456789" is issued as the ID. Although the form data included in the form data management table 700 can be obtained using this ID, the ID is invalidated if the form data access table 700 is not accessed for a predetermined amount of time or more.

FIG. 16 illustrates an example of the script returned by the script returning unit 614 in S1016. A function 1601 indicates a function "load" that issues a request for form data for the autocomplete to the form data management application 610 and sets values in the elements included in the HTML data loaded by the web browser 405.

A script 1602 is a script that sets the form data obtained from the form data management application 610 in the elements included in the HTML data loaded by the web browser 405. A script 1603 is a script that issues a request for form data to a form data obtainment service of the form data returning unit 612, indicated by a URL "https://form-dataserver.xxx.yyy/loadService". This request includes the ID for specifying the form data, issued in advance by the form data management unit 613 ("0123456789", for example).

A function 1604 indicates a function "save" for sending the form data (user information, here) entered by the user through the screen displayed in the web browser 405 to the form data management application 610 and saving the data. A script 1605 is a script that loads the element names and values from the form included in the HTML data and sets those names and values in a variable "reqdata". A script 1606 is a script that issues a request to save the above-described "reqdata" to a form data saving service of the form data returning unit 612, indicated by a URL "https://form-dataserver.xxx.yyy/saveService". This request includes the ID "0123456789" issued in advance by the form data management unit 613.

A function 1607 indicates a function executed automatically when the script illustrated in FIG. 16 is loaded. A script 1608 is a script that adds a display object (a load button), for calling the function 1601, to the HTML data loaded by the web browser 405. A script 1609 is a script that adds a display object (a save button), for calling the function of the script 1604, to the HTML data loaded by the web browser 405. A script 1610 is a script for calling the function 1601.

In S1017, the web browser 405 instructs the script execution unit 406 to execute the script illustrated in FIG. 16, which has been returned from the form data management application 610. The script execution unit 406 executes the script illustrated in FIG. 16 in response to this instruction. In S1018, the script execution unit 406 executes the scripts 1608 and 1609. Data for displaying the load button and the save button is added to the HTML data loaded by the web browser 405 as a result. Then, the script execution unit 406 executes the script 1610, and as a result, the function 1601 is called and the script 1603 is executed.

In S1019, as a result of the script execution unit 406 executing the script 1603, a request for the form data is issued to the form data management application 610. Having received this request, in S1020, the form data management application 610 returns, using the form data returning unit 612, the form data, among the form data included in the form data management table 700, the corresponds to the ID included in the request.

In the case of FIG. 7, the element name and value corresponding to the ID "0123456789", i.e. the element name and value matching the two keys of "http://authappserver.xxx.yyy/service1/login.html" and "user1", are returned. Specifically, the information "xxx" for "username" and "yyy" for "password" is returned. Note that if the screens for entering the username and password have different URLs, the element names and values matching those respective keys are returned. For example, if the URL at which the username is entered is "http://www.server-B.xxx.yyy/service2/logonid.html", the value "zzz@@zzz.com" of the "email" element in FIG. 7 is returned. The script execution unit 406 executes the script 1602 after receiving the response from the form data management application 610 in S1020. As a result of the script 1602 being executed, in S1021, the HTML data is overwritten in order to set the form data obtained from the form data management application 610 in the HTML data loaded by the web browser 405. Note that if the screens in which the username and password are entered have different URLs, the HTML data is overwritten in the screen for entering the password as well by repeating the processing from S1009 to S1021 for each URL.

FIG. 14B illustrates the screen displayed in the web browser 405 as a result of the processes of S1018 and S1021 being executed. A GUI button 1411 and the GUI button 1412 are display objects added as a result of the HTML data being overwritten in S1018. Additionally, as indicated by 1413 and 1414, the username "xxx" and the password "yyy" are autocompleted (preset) in the text box field 1402 and the password field 1403 as a result of the process of S1021. Although the value "yyy" is actually set in 1414, the content thereof is a password, and thus "*" is displayed in the screen. FIGS. 14E and 14F illustrate screens displayed when the screens in which the username and password are entered have different URLs. A GUI button 1420, the GUI button 1421, a GUI button 1424, and the GUI button 1425 are display objects added as a result of the HTML data being overwritten in S1018. Additionally, as indicated by 1419 and 1423, the username "zzz@zzz.com" and the password "zzzzzzz" are autocompleted (preset) in the text box field 1422 and the password field 1426 as a result of the process of S1021. Although the value "zzzzzzz" is actually set in 1426, the content thereof is a password, and thus "*" is displayed in the screen.

If the user has mistakenly changed the content of 1413 and 1414, or 1422 and 1426, from the state in which the user information has been autocompleted as illustrated in FIGS. 14B, 14E, and 14F, the autocomplete process can be executed again by pressing the GUI button 1411, or a GUI button 1410 and a GUI button 1424. When the user presses the GUI button 1411, or the GUI button 1420 and the GUI button 1424, the web browser 405 calls the script execution unit 406, and the script 1601 is executed.

Form Data Saving Process

Figure 17:
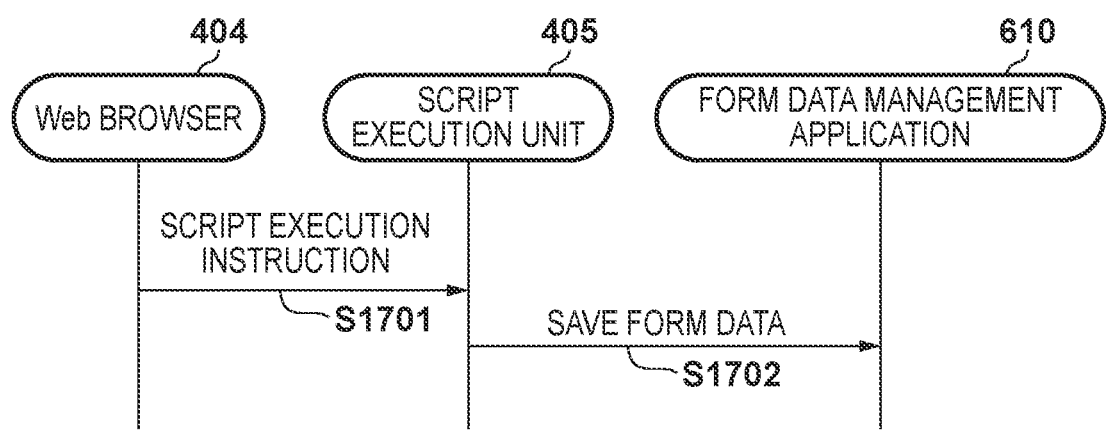
FIG. 17 is a diagram illustrating the sequence of a form data saving process.

A process for newly saving user information, entered manually by the user through the screen displayed in the web browser 405, in the form data management application 610 for the next and subsequent login processes, will be described next with reference to FIG. 17. In other words, this saving process saves user information for executing the autocomplete function during the next login process when new user information is entered. The sequence illustrated in FIG. 17 is started when, in a state in which the screen illustrated in FIG. 14B, or in FIGS. 14E and 14F, are displayed in the web browser 405, the user manually enters information and then presses the GUI button 1412, or the GUI button 1421 and the GUI button 1425.

In S1701, the web browser 405 instructs the script execution unit 406 to execute the script indicated by 1604 in FIG. 16. In S1702, the script execution unit 406 executes the script 1604, and as a result, a request to save the form data is issued to the form data management application 610. This request includes the element name and value of the form, and furthermore the ID that was issued in advance. On the form data management application 610 side, the content of the form data management table 700 is updated in response to the request from the script execution unit 406.

As described thus far, according to the present embodiment, when HTML data using a specific URL is received (and a screen is displayed), the form data managed by the form data management application 610, which is external to the MFP 101, is autocompleted only for a screen displayed in response to a GUI button registered by the administrator of the MFP 101 being pressed. It is thus possible to eliminate the burden on the user for entering the user information that must be entered in the user information entry screen to log into the authentication web application 814, which has a different domain from the web application 810, for example. Additionally, when new user information has been entered, that information can be communicated to the form data management application 610, and the information can be updated. It is additionally possible to eliminate the burden on the user for entering the user information that must be entered in the user information entry screen to log into the authentication web application 814, even when the screen for entering the username and the screen for entering the password are different. Furthermore, the autocomplete is limited to a screen displayed in response to a GUI button registered by the administrator of the MFP 101 being pressed, which suppresses a situation in which user information such as usernames and passwords is leaked. Thus according to the present embodiment, it is not necessary to manage autocomplete information in a client apparatus such as the MFP 101, and instead, the information can be managed in a server apparatus, namely the form data management server 103. As such, by using the web server 102 and the form data management server 103, a client apparatus in this system can implement a secure autocomplete function without holding information of each user itself. Additionally, according to the present embodiment, a page on a different domain from the web application 810, for which the burden of entering information is to be reduced for the user, can be designated by the web application 810, as described above. As such, maintenance for the autocomplete function can be carried out easily by performing maintenance on the web server 102, without needing to perform maintenance on every client apparatus in the information processing system. Note that the present invention can also be applied in a server that integrates the web server 102 and the form data management server 103.

Although an example in which user information used for user authentication is autocompleted has been described here, the information subject autocomplete is not limited thereto, and may be search keywords, standard greetings, or the like, for example. Additionally, the autocomplete is not limited to keywords, and can also be applied to selections from a pulldown menu, checks entered into checkboxes, and so on.

Additionally, although the script execution unit 406 and the web browser 405 communicate with the form data management application 610 in S1015, S1016, S1019, and S1020 of FIG. 10B, this communication may be carried out via the web browser monitoring unit 408. This has an advantage in that the form data management application 610 side may be capable of handling a communication protocol aside from HTTP.

Additionally, although an example in which the web browser monitoring unit 408 holds the script illustrated in FIG. 15 has been described, the script may instead be held by the web browser 405 as a bookmark. In this case, the web browser monitoring unit 408 specifies a bookmark ID in the script loading instruction of S1011 in FIG. 10B, and the web browser 405 loads bookmark information (the script illustrated in FIG. 15) corresponding to the specified bookmark ID.

Other Embodiments

Although the form data management server 103 is described as an independent device in the foregoing embodiment, the server may be the same device as other servers, or may be a function built into the MFP. The same applies to the other servers as well.

The present invention can be summarized as follows.

An information processing apparatus (or image forming apparatus) capable of communicating with a web server and an authentication web server that provide screen information, and a management server including a table defining form data including values to be entered for each type of form contained in specific screen information, the apparatus comprising:

a web browser that makes an obtainment request for the screen information to the web server, loads the obtained screen information, and redirects to the authentication web server using information included in a response to the obtainment request; and a monitoring unit that determines whether or not a URL of a screen displayed by the web browser matches a first URL or a second URL included in the response to the obtainment request, and in the case where it is determined that the URL of the screen displayed by the web browser matches a URL in a first argument or a URL in a second argument included in the response to the obtainment request, a user currently using the information processing apparatus is a user permitted to use an autocomplete function, and the screen displayed in the web browser can be trusted, instructs the web browser to load and execute a first script by a saving unit that saves authentication information included in the response to the obtainment request, wherein by executing the first script, form data based on the user currently using the information processing apparatus and the screen information is obtained from the management server, and a screen containing the screen information and values of the form data to be entered is displayed in a display unit.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-049060, filed Mar. 14, 2017, Japanese Patent Application No. 2017-230865, filed Nov. 30, 2017 which are hereby incorporated by reference herein in their entirety.

What is claimed is:

1. An information processing apparatus, including a web browser, that can connect to a web server, the apparatus comprising:

at least one processor and at least one memory coupled to each other and cooperating to act as:

an obtainment unit that obtains location information indicating at least one location of user interface information expressing at least one user interface for entering first user information for authentication requested by the web server; and a setting unit that, if supplementary information entered previously through the user interface based on the at least one user interface information and associated with second user information that is user information of a user logged into the information processing apparatus is saved, sets the supplementary information as a value of the first user information entered through the at least one user interface in the case where the web browser has received the user interface information on the basis of the location information, wherein each of the first and second user information include a user ID and a password, and wherein a user interface screen for entering the user ID and a user interface screen for entering the password are screens different from each other.

2. The information processing apparatus according to claim 1, wherein the web browser can execute a loaded script; and if supplementary information entered previously through the at least one user interface and associated with the second user information is saved, the setting unit sets the supplementary information as a value of the first user information entered through the at least one user interface displayed by the web browser by loading a script for setting the supplementary information in the web browser and causing the web browser to execute the script.

3. The information processing apparatus according to claim 2, wherein the obtainment unit obtains the location information and the user information received by the web browser from the web server by loading a script for obtaining the location information and the user information from the web browser in the web browser and causing the script to be executed.

4. The information processing apparatus according to claim 1, wherein the at least one processor and the at least one memory further cooperates as:
a saving unit that saves values entered through the at least one user interface for entering the first user information as the supplementary information entered previously through the at least one user interface and associated with the second user information.

5. The information processing apparatus according to claim 4,
wherein the web browser receives the location information from the web server; and
the obtainment unit obtains the location information via the web browser.

6. The information processing apparatus according to claim 5,
wherein in addition to the location information, the obtainment unit receives, from the web server, information specifying a timing at which the saving unit saves the supplementary information.

7. The information processing apparatus according to claim 6,
wherein in the case where the obtained location information indicates two locations, the setting unit determines that the user interface information having a location indicated by the location information is user interface information for entering the user ID and the password through respective user interfaces; and
in the case where the web browser has received the user interface information for entering the user ID and the password, respectively, on the basis of the location information, if supplementary information of the user ID and the password, respectively, entered previously through the user interfaces for the user ID and the password based on the user interface information and associated with the second user information is saved, the setting unit further sets that supplementary information as values entered through the user interfaces of the user ID and the password, respectively.

8. The information processing apparatus according to claim 7,
wherein in the case where an entry time of the user ID is specified by the information specifying the timing of saving the supplementary information, the saving unit saves the entered user ID as the supplementary information, and in the case where an entry time of the password is specified, the saving unit saves the entered user ID and password as the supplementary information.

9. The information processing apparatus according to claim 4, wherein the at least one processor and the at least one memory further cooperates as:
a management unit that manages the location information entered by a user,
wherein the obtainment unit obtains the location information from the management unit.

10. The information processing apparatus according to claim 9,
wherein in addition to the location information, the management unit manages information, entered by the user, specifying the timing at which the saving unit saves the supplementary information.

11. The information processing apparatus according to claim 4,
wherein in the case where the obtained location information indicates one location, the setting unit determines that the user interface information having a location indicated by the location information is user interface information for entering a user ID and a password through a single user interface; and
in the case where the web browser has received the user interface information for entering the user ID and the password on the basis of the location information, if supplementary information of the user ID and the password, respectively, entered previously through a user interface based on the user interface information and associated with the second user information is saved, the setting unit further sets that supplementary information as values entered through the user interface of the user ID and the password.

12. The information processing apparatus according to claim 11,
wherein the saving unit saves the entered user ID and password as the supplementary information.

13. The information processing apparatus according to claim 1,
wherein the location information indicates a location of user interface information provided by a connected authentication web server.

14. The information processing apparatus according to claim 1,
wherein the supplementary information is saved by a connected form data management server.

15. An information processing system comprising, in a connected state:
a web server;
an authentication web server;
a form data management server; and
an information processing apparatus, including a web browser, that can connect to a web server, the apparatus comprising:
an obtainment unit that obtains location information indicating at least one location of user interface information expressing at least one user interface for entering first user information for authentication requested by the web server; and
a setting unit that, if supplementary information entered previously through the at least one user interface based on the user interface information and associated with second user information that is user information of a user logged into the information processing apparatus is saved, sets the supplementary information as a value of the first user information entered through the at least one user interface in the case where the web browser has received the user interface information on the basis of the location information,
wherein each of the first and second user information include a user ID and a password, and
wherein a user interface screen for entering the user ID and a user interface screen for entering the password are screens different from each other.

16. A non-transitory computer-readable medium on which is stored a program for causing a computer, including a web browser, that can connect to a web server, to function as:
an obtainment unit that obtains location information indicating at least one location of user interface information expressing at least one user interface for entering first user information for authentication requested by the web server; and a setting unit that, if supplementary information entered previously through the at least one user interface based on the user interface information and associated with second user information that is user information of a user logged into the computer is saved, sets the supplementary information as a value of the user information entered through the at least one user interface in the case where the web browser has received the user interface information on the basis of the location information, wherein each of the first and second user information include a user ID and a password, and wherein a user interface screen for entering the user ID and a user interface screen for entering the password are screens different from each other.

17. An information processing method executed by an information processing apparatus, the apparatus including a web browser and being able to connect to a web server, the method comprising:

obtaining location information indicating at least one location of user interface information expressing at least one user interface for entering first user information for authentication requested by the web server; and if supplementary information entered previously through the at least one user interface based on the user interface information and associated with second user information that is user information of a user logged into the information processing apparatus is saved, setting the supplementary information as a value of the user information entered through the at least one user interface in the case where the web browser has received the user interface information on the basis of the location information, wherein each of the first and second user information include a user ID and a password, and wherein a user interface screen for entering the user ID and a user interface screen for entering the password are screens different from each other.

18. The information processing method according to claim 17, wherein in the case where the obtained location information indicates two locations, it is determined that the user interface information having a location indicated by the location information is user interface information for entering the user ID and the password through respective user interfaces; and in the case where the web browser has received the user interface information for entering the user ID and the password, respectively, on the basis of the location information, if supplementary information of the user ID and the password, respectively, entered previously through the user interfaces for the user ID and the password based on the user interface information and associated with the second user information is saved, that supplementary information is further set as values entered through the user interfaces of the user ID and the password, respectively.

19. The information processing method according to claim 17, wherein in the case where the obtained location information indicates one location, it is determined that the user interface information having a location indicated by the location information is user interface information for entering the user ID and the password through a single user interface; and in the case where the web browser has received the user interface information for entering the user ID and the password on the basis of the location information, if supplementary information of the user ID and the password, respectively, entered previously through a user interface based on the user interface information and associated with the second user information is saved, that supplementary information is further set as values entered through the user interface of the user ID and the password.

* * * * *